United States Patent
Galloway et al.

(10) Patent No.: US 8,239,624 B2
(45) Date of Patent: *Aug. 7, 2012

(54) METHOD AND SYSTEM FOR DATA MIGRATION IN A DISTRIBUTED RAID IMPLEMENTATION

(75) Inventors: William C. Galloway, Magnolia, TX (US); Ryan A. Callison, Magnolia, TX (US); Greg J. Pellegrino, Tomball, TX (US); Choon-Seng Tan, Houston, TX (US); George J. Scholhamer, III, Tomball, TX (US)

(73) Assignee: Pivot3, Inc., Spring, TX (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/479,360

(22) Filed: Jun. 5, 2009

(65) Prior Publication Data
US 2009/0307422 A1    Dec. 10, 2009

Related U.S. Application Data

(60) Provisional application No. 61/131,314, filed on Jun. 6, 2008, provisional application No. 61/131,270, filed on Jun. 6, 2008, provisional application No. 61/131,291, filed on Jun. 6, 2008, provisional application No. 61/131,290, filed on Jun. 6, 2008, provisional application No. 61/131,379, filed on Jun. 6, 2008, provisional application No. 61/131,312, filed on Jun. 6, 2008.

(51) Int. Cl.
*G06F 12/16* (2006.01)
(52) U.S. Cl. .......................... 711/114; 714/6.2
(58) Field of Classification Search .................. None
See application file for complete search history.

(56) References Cited

U.S. PATENT DOCUMENTS

| | | | |
|---|---|---|---|
| 6,304,942 B1 | 10/2001 | DeKoning et al. | |
| 6,895,485 B1 | 5/2005 | DeKoning et al. | |
| 7,032,086 B2 * | 4/2006 | Merchant | 711/156 |
| 7,096,316 B1 | 8/2006 | Karr et al. | |
| 7,130,960 B1 | 10/2006 | Kano | |
| 7,366,837 B2 | 4/2008 | Corbett et al. | |
| 7,389,393 B1 | 6/2008 | Karr et al. | |
| 8,082,393 B2 | 12/2011 | Galloway | |
| 8,086,797 B2 | 12/2011 | Galloway | |
| 8,090,909 B2 | 1/2012 | Galloway | |
| 8,127,076 B2 | 2/2012 | Galloway | |
| 8,140,753 B2 | 3/2012 | Galloway et al. | |
| 8,145,841 B2 | 3/2012 | Galloway | |

(Continued)

OTHER PUBLICATIONS

Hartman et al. ("The Zebra Striped Network File System"; published by ACM Transactions on Computer Systems, vol. 13, No. 3, Aug. 1995, pp. 274-310).*

(Continued)

*Primary Examiner* — Kaushikkumar Patel
(74) *Attorney, Agent, or Firm* — Sprinkle IP Law Group

(57) ABSTRACT

Embodiments of the systems and methods disclosed provide a distributed RAID system comprising a set of data banks. More particularly, in certain embodiments of a distributed RAID system each data bank has a set of associated storage media and executes a similar distributed RAID application. The distributed RAID applications on each of the data banks coordinate among themselves to distribute and control data flow associated with implementing a level of RAID in conjunction with a volume stored on the associated storage media of the data banks. Migration of this volume, or a portion thereof, from one configuration to another configuration may be accomplished such that the volume, or the portion thereof, and corresponding redundancy data may be stored according to this second configuration.

21 Claims, 24 Drawing Sheets

U.S. PATENT DOCUMENTS

| | | | |
|---|---|---|---|
| 8,176,247 | B2 | 5/2012 | Galloway et al. |
| 2002/0035667 | A1 | 3/2002 | Brunning, III et al. |
| 2002/0069317 | A1 | 6/2002 | Chow et al. |
| 2002/0069318 | A1 | 6/2002 | Chow et al. |
| 2002/0087751 | A1 | 7/2002 | Chong, Jr. |
| 2003/0135709 | A1 | 7/2003 | Niles et al. |
| 2003/0159001 | A1 | 8/2003 | Chalmer et al. |
| 2004/0003173 | A1* | 1/2004 | Yao et al. ................ 711/114 |
| 2004/0153479 | A1* | 8/2004 | Mikesell et al. ........... 707/200 |
| 2004/0168018 | A1 | 8/2004 | Aasheim et al. |
| 2004/0177218 | A1 | 9/2004 | Meehan et al. |
| 2004/0221070 | A1 | 11/2004 | Ortega, III et al. |
| 2005/0015700 | A1 | 1/2005 | Hetzler et al. |
| 2005/0114350 | A1* | 5/2005 | Rose et al. ................ 707/10 |
| 2006/0129559 | A1 | 6/2006 | Sankaran et al. |
| 2006/0242377 | A1 | 10/2006 | Kanie et al. |
| 2006/0248273 | A1* | 11/2006 | Jernigan et al. ............ 711/114 |
| 2006/0248379 | A1* | 11/2006 | Jernigan, IV ............... 714/6 |
| 2006/0271734 | A1 | 11/2006 | Strange et al. |
| 2006/0277383 | A1 | 12/2006 | Hayden et al. |
| 2007/0073990 | A1* | 3/2007 | Snaman et al. ............ 711/165 |
| 2007/0094348 | A1 | 4/2007 | Scheidel et al. |
| 2007/0143541 | A1 | 6/2007 | Nichols et al. |
| 2007/0271434 | A1 | 11/2007 | Kawamura et al. |
| 2008/0104443 | A1 | 5/2008 | Akutsu et al. |
| 2008/0109601 | A1 | 5/2008 | Klemm et al. |
| 2008/0155191 | A1* | 6/2008 | Anderson et al. .......... 711/114 |
| 2008/0222633 | A1 | 9/2008 | Kami |
| 2008/0256292 | A1 | 10/2008 | Flynn et al. |
| 2008/0270680 | A1 | 10/2008 | Chang |
| 2009/0006746 | A1* | 1/2009 | Sharma et al. ............. 711/114 |
| 2009/0172335 | A1 | 7/2009 | Kulkarni et al. |
| 2012/0054431 | A1 | 3/2012 | Galloway et al. |
| 2012/0054432 | A1 | 3/2012 | Galloway et al. |
| 2012/0054433 | A1 | 3/2012 | Galloway et al. |
| 2012/0124286 | A1 | 5/2012 | Galloway et al. |
| 2012/0131383 | A1 | 5/2012 | Galloway et al. |
| 2012/0137069 | A1 | 5/2012 | Galloway et al. |

OTHER PUBLICATIONS

International Preliminary Report on Patentability issued for PCT Patent Application No. PCT/US2009/046470, mailed on Dec. 16, 2010, issued on Dec. 6, 2010, 8 pgs.
International Preliminary Report on Patentability issued for PCT Patent Application No. PCT/US2009/046471, mailed on Dec. 16, 2010, issued on Dec. 6, 2010, 8 pgs.
International Preliminary Report on Patentability issued for PCT Patent Application No. PCT/US2009/046473, mailed on Dec. 16, 2010, issued on Dec. 6, 2010, 7 pgs.
International Preliminary Report on Patentability issued for PCT Patent Application No. PCT/US2009/048570, mailed on Jan. 13, 2011, issued on Jan. 5, 2011, 8 pgs.
International Search Report for PCT Application No. PCT/US2009/046471 completed Dec. 16, 2009, mailed Dec. 28, 2009, 9 pgs.
International Search Report and Written Opinion for PCT/US2009/046470 mailed on Jul. 21, 2009.
International Search Report and Written Opinion for PCT/US2009/046473 mailed on Jul. 14, 2009.
International Search Report and Written Opinion for PCT/US2009/048570 mailed on Aug. 5, 2009.
International Search Report and Written Opinion for PCT/US2009/048574 mailed Aug. 20, 2009.
Office Action for U.S. Appl. No. 12/479,377, mailed Jul. 29, 2011, 23 pgs.
Office Action issued for U.S. Appl. No. 12/479,434, mailed May 11, 2011, 13 pgs.
International Preliminary Report on Patentability for PCT Patent Application No. PCT/US2009/048574, mailed May 12, 2011, 9 pgs.
Office Action issued for U.S. Appl. No. 12/479,319 mailed Jun. 22, 2011, 18 pgs.
Office Action issued for U.S. Appl. No. 12/479,403, mailed Jun. 24, 2011, 13 pgs.
Notice of Allowance issued in U.S. Appl. No. 12/479,403, mailed Sep. 30, 2011, 14 pgs.
Notice of Allowance issued in U.S. Appl. No. 12/479,319, mailed Oct. 5, 2011, 14 pgs.
Notice of Allowance issued in U.S. Appl. No. 12/479,394, mailed Oct. 5, 2011, 8 pgs.
Notice of Allowance issued in U.S. Appl. No. 12/479,434, mailed Sep. 21, 2011, 9 pgs.
Notice of Allowance issued for U.S. Appl. No. 13/224,936, mailed Dec. 14, 2011, 9 pgs.
Notice of Allowance for U.S. Appl. No. 12/490,916, mailed Jan. 9, 2012, 5 pgs.
Office Action issued in U.S. Appl. No. 13/224,936, mailed Oct. 12, 2011, 8 pgs.
Office Action issued in U.S. Appl. No. 12/490,810, mailed Oct. 18, 2011, 21 pgs.
Notice of Allowance issued for U.S. Appl. No. 12/479,377, mailed Nov. 18, 2011, 8 pgs.
Office Action issued for U.S. Appl. No. 13/366,069, mailed Mar. 13, 2012, 9 pages.
Office Action issued in U.S. Appl. No. 13/292,388, mailed Jan. 20, 2012, 6 pages.
Notice of Allowance issued for U.S. Appl. No. 12/490,810, mailed Feb. 16, 2012, 8 pages.
Office Action issued for U.S. Appl. No. 13/291,309, mailed Feb. 24, 2012, 10 pages.
Office Action issued for U.S. Appl. No. 13/291,311 mailed Feb. 1, 2012, 12 pages.
Office Action issued for U.S. Appl. No. 13/358,306, mailed Apr. 4, 2012, 21 pages.
Supplemental Notice of Allowance for U.S. Appl. No. 12/490,916, mailed Apr. 9, 2012, 4 pages.
Notice of Allowance issued for U.S. Appl. No. 13/291,309, mailed Apr. 12, 2012, 5 pages.
Notice of Allowance issued for U.S. Appl. No. 13/291,311, mailed Apr. 13, 2012, 5 pages.
Supplemental Notice of Allowance issued for U.S. Appl. No. 13/291,309, mailed May 22, 2012, 5 pages.
Corrected Notice of Allowance issued for U.S. Appl. No. 13/291,311, mailed May 22, 2012, 5 pages.
Office Action issued for U.S. Appl. No. 13/364,439, mailed May 25, 2012, 21 pages.
Notice of Allowance issued for U.S. Appl. No. 13/366,069, mailed Jun. 8, 2012, 6 pages.
Corrected Notice of Allowance issued for U.S. Appl. No. 13/291,311, mailed Jun. 21, 2012, 5 pages.
Supplemental Notice of Allowance issued for U.S. Appl. No. 13/291,309, mailed Jun. 22, 2012, 5 pages.
Office Action issued for U.S. Appl. No. 12/914,559, mailed Jun. 25, 2012, 15 pages.

* cited by examiner

| | | |
|---|---|---|
| TABLE 550 | 4 BYTES | LV NUMBER | 504
| | 4 BYTES | SEGMENT SIZE | 508
| | 8 BYTES | SEGMENT COUNT | 512
| | 4 BYTES | QUALITY OF SERVICE | 514
| | 4 BYTES | RANGE COUNT | 518

| 524a INFORMATION FOR RANGE | | | |
|---|---|---|---|
| | 4 BYTES | TYPE | 526a |
| | 8 BYTES | START | 530a |
| | 8 BYTES | END | 534a |
| | 2 BYTES | NETWORK RAID | 538a |
| | 2 BYTES | NETWORK RAID SIZE | 542a |
| | 2 BYTES | DISK RAID | 546a |
| | 2 BYTES | DISK RAID SIZE | 552a |
| | 4 BYTES | DATA BANK COUNT | 554a |
| | 4 BYTES | DATA BANK ORDER | 558a |
| | 4 BYTES | DISK COUNT | 562a |
| | 4 BYTES | DISK ORDER | 566a |
| | ... | ... | |
| | 4 BYTES | DISK COUNT | 562an |
| | 4 BYTES | DISK ORDER | 566an |

| 524b INFORMATION FOR RANGE | | | |
|---|---|---|---|
| | 4 BYTES | TYPE | 526b |
| | 8 BYTES | START | 530b |
| | 8 BYTES | END | 534b |
| | 2 BYTES | NETWORK RAID | 538b |
| | 2 BYTES | NETWORK RAID SIZE | 542b |
| | 2 BYTES | DISK RAID | 546b |
| | 2 BYTES | DISK RAID SIZE | 552b |
| | 4 BYTES | DATA BANK COUNT | 554b |
| | 4 BYTES | DATA BANK ORDER | 558b |
| | 4 BYTES | DISK COUNT | 562b |
| | 4 BYTES | DISK ORDER | 566b |
| | ... | ... | |
| | 4 BYTES | DISK COUNT | 562bn |
| | 4 BYTES | DISK ORDER | 566bn |

| ADDITIONAL RANGE ENTRIES | 524n |
|---|---|

*FIG. 5*

| DISK TABLE 670 | | | |
|---|---|---|---|
| PHYSICAL SEGMENT 1 | LV NUMBER | LOGICAL SEGMENT NUMBER | ADDRESS SPACE | SECTOR STATE |
| PHYSICAL SEGMENT 2 | LV NUMBER | LOGICAL SEGMENT NUMBER | ADDRESS SPACE | SECTOR STATE |
| PHYSICAL SEGMENT 3 | LV NUMBER | LOGICAL SEGMENT NUMBER | ADDRESS SPACE | SECTOR STATE |
| PHYSICAL SEGMENT 4 | LV NUMBER | LOGICAL SEGMENT NUMBER | ADDRESS SPACE | SECTOR STATE |
| PHYSICAL SEGMENT 5 | LV NUMBER | LOGICAL SEGMENT NUMBER | ADDRESS SPACE | SECTOR STATE |
| PHYSICAL SEGMENT 6 | LV NUMBER | LOGICAL SEGMENT NUMBER | ADDRESS SPACE | SECTOR STATE |
| ○○○ | ○○○ | ○○○ | ○○○ | ○○○ |
| PHYSICAL SEGMENT (n) | LV NUMBER | LOGICAL SEGMENT NUMBER | ADDRESS SPACE | SECTOR STATE |
| PHYSICAL SEGMENT (n+1) | LV NUMBER | LOGICAL SEGMENT NUMBER | ADDRESS SPACE | SECTOR STATE |

*FIG. 7*

| | | |
|---|---|---|
| TABLE 1650 | 4 BYTES | LV NUMBER |
| | 4 BYTES | SEGMENT SIZE |
| | 8 BYTES | SEGMENT COUNT 10000 |
| | 4 BYTES | QUALITY OF SERVICE |
| | 4 BYTES | RANGE COUNT 2 |
| 1624a INFORMATION FOR FIRST RANGE | 4 BYTES | TYPE NORMAL |
| | 8 BYTES | START 0 |
| | 8 BYTES | END 4999 |
| | 2 BYTES | NETWORK RAID LEVEL 5 |
| | 2 BYTES | NETWORK RAID SIZE 3+1 |
| | 2 BYTES | DISK RAID |
| | 2 BYTES | DISK RAID SIZE |
| | 4 BYTES | DATA BANK COUNT 4 |
| | 4 BYTES | DATA BANK ORDER 2,4,3,1 |
| | 4 BYTES | DISK COUNT |
| | 4 BYTES | DISK ORDER |
| | | ∘ ∘ ∘ |
| | 4 BYTES | DISK COUNT |
| | 4 BYTES | DISK ORDER |
| 1624b INFORMATION FOR SECOND RANGE | 4 BYTES | TYPE NORMAL |
| | 8 BYTES | START 5000 |
| | 8 BYTES | END 9999 |
| | 2 BYTES | NETWORK RAID LEVEL 5 |
| | 2 BYTES | NETWORK RAID SIZE 4+1 |
| | 2 BYTES | DISK RAID |
| | 2 BYTES | DISK RAID SIZE |
| | 4 BYTES | DATA BANK COUNT 5 |
| | 4 BYTES | DATA BANK ORDER 4,2,1,3,5 |
| | 4 BYTES | DISK COUNT |
| | 4 BYTES | DISK ORDER |
| | | ∘ ∘ ∘ |
| | 4 BYTES | DISK COUNT |
| | 4 BYTES | DISK ORDER |

*FIG. 16*

| | | |
|---|---|---|
| TABLE 1650 | 4 BYTES | LV NUMBER |
| | 4 BYTES | SEGMENT SIZE |
| | 8 BYTES | SEGMENT COUNT 10000 |
| | 4 BYTES | QUALITY OF SERVICE |
| | 4 BYTES | RANGE COUNT 3 |
| 1624a | | INFORMATION FOR FIRST RANGE |
| 1624b SECOND RANGE ENTRY | 4 BYTES | TYPE NORMAL |
| | 8 BYTES | START 6000 |
| | 8 BYTES | END 9999 |
| | 2 BYTES | NETWORK RAID LEVEL 5 |
| | 2 BYTES | NETWORK RAID SIZE 4+1 |
| | 2 BYTES | DISK RAID |
| | 2 BYTES | DISK RAID SIZE |
| | 4 BYTES | DATA BANK COUNT 5 |
| | 4 BYTES | DATA BANK ORDER 4,2,1,3,5 |
| | 4 BYTES | DISK COUNT |
| | 4 BYTES | DISK ORDER |
| | | ○ ○ ○ |
| | 4 BYTES | DISK COUNT |
| | 4 BYTES | DISK ORDER |
| 1624c THIRD RANGE ENTRY | 4 BYTES | TYPE SOURCE |
| | 8 BYTES | START 5000 |
| | 8 BYTES | END 5999 |
| | 2 BYTES | NETWORK RAID LEVEL 5 |
| | 2 BYTES | NETWORK RAID SIZE 4+1 |
| | 2 BYTES | DISK RAID |
| | 2 BYTES | DISK RAID SIZE |
| | 4 BYTES | DATA BANK COUNT 5 |
| | 4 BYTES | DATA BANK ORDER 4,2,1,3,5 |
| | 4 BYTES | DISK COUNT |
| | 4 BYTES | DISK ORDER |
| | | ○ ○ ○ |
| | 4 BYTES | DISK COUNT |
| | 4 BYTES | DISK ORDER |

*FIG. 17*

| | 4 BYTES | LV NUMBER |
|---|---|---|
| TABLE 1650 | 4 BYTES | SEGMENT SIZE |
| | 8 BYTES | SEGMENT COUNT 10000 |
| | 4 BYTES | QUALITY OF SERVICE |
| | 4 BYTES | RANGE COUNT 3 |
| 1624a | | INFORMATION FOR FIRST RANGE |
| | 4 BYTES | TYPE NORMAL |
| | 8 BYTES | START 6000 |
| | 8 BYTES | END 9999 |
| | 2 BYTES | NETWORK RAID LEVEL 5 |
| | 2 BYTES | NETWORK RAID SIZE 4+1 |
| | 2 BYTES | DISK RAID |
| | 2 BYTES | DISK RAID SIZE |
| 1624b | 4 BYTES | DATA BANK COUNT 5 |
| | 4 BYTES | DATA BANK ORDER 4,2,1,3,5 |
| | 4 BYTES | DISK COUNT |
| | 4 BYTES | DISK ORDER |
| | | o<br>o<br>o |
| | 4 BYTES | DISK COUNT |
| | 4 BYTES | DISK ORDER |

| | 4 BYTES | TYPE SOURCE | 4 BYTES | TYPE DESTINATION |
|---|---|---|---|---|
| | 8 BYTES | START 5000 | 8 BYTES | START 5000 |
| | 8 BYTES | END 5999 | 8 BYTES | END 5999 |
| | 2 BYTES | NETWORK RAID LEVEL 5 | 2 BYTES | NETWORK RAID 5 |
| | 2 BYTES | NETWORK RAID SIZE 4+1 | 2 BYTES | NETWORK RAID SIZE 5+1 |
| | 2 BYTES | DISK RAID | 2 BYTES | DISK RAID |
| | 2 BYTES | DISK RAID SIZE | 2 BYTES | DISK RAID SIZE |
| 1624c | 4 BYTES | DATA BANK COUNT 5 | 4 BYTES | DATA BANK COUNT 6 |
| | 4 BYTES | DATA BANK ORDER 4,2,1,3,5 | 4 BYTES | DATA BANK ORDER 1,6,2,3,4,5 |
| | 4 BYTES | DISK COUNT | 4 BYTES | DISK COUNT |
| | 4 BYTES | DISK ORDER | 4 BYTES | DISK ORDER |
| | | o<br>o<br>o | | o<br>o<br>o |
| | 4 BYTES | DISK COUNT | 4 BYTES | DISK COUNT |
| | 4 BYTES | DISK ORDER | 4 BYTES | DISK ORDER |

1626 points to the right-hand table.

*FIG. 18*

| | 4 BYTES | LV NUMBER |
|---|---|---|
| TABLE 1650 | 4 BYTES | SEGMENT SIZE |
| | 8 BYTES | SEGMENT COUNT 10000 |
| | 4 BYTES | QUALITY OF SERVICE |
| | 4 BYTES | RANGE COUNT 3 |
| 1624a | | INFORMATION FOR FIRST RANGE |
| | 4 BYTES | TYPE NORMAL |
| | 8 BYTES | START 6000 |
| | 8 BYTES | END 9999 |
| | 2 BYTES | NETWORK RAID LEVEL 5 |
| | 2 BYTES | NETWORK RAID SIZE 4+1 |
| | 2 BYTES | DISK RAID |
| | 2 BYTES | DISK RAID SIZE |
| 1624b SECOND RANGE ENTRY | 4 BYTES | DATA BANK COUNT 5 |
| | 4 BYTES | DATA BANK ORDER 4,2,1,3,5 |
| | 4 BYTES | DISK COUNT |
| | 4 BYTES | DISK ORDER |
| | | ⋮ |
| | 4 BYTES | DISK COUNT |
| | 4 BYTES | DISK ORDER |
| | 4 BYTES | TYPE NORMAL |
| | 8 BYTES | START 5000 |
| | 8 BYTES | END 5999 |
| | 2 BYTES | NETWORK RAID LEVEL 5 |
| | 2 BYTES | NETWORK RAID SIZE 5+1 |
| | 2 BYTES | DISK RAID |
| | 2 BYTES | DISK RAID SIZE |
| 1624d NEW RANGE ENTRY | 4 BYTES | DATA BANK COUNT 6 |
| | 4 BYTES | DATA BANK ORDER 1,6,2,3,4,5 |
| | 4 BYTES | DISK COUNT |
| | 4 BYTES | DISK ORDER |
| | | ⋮ |
| | 4 BYTES | DISK COUNT |
| | 4 BYTES | DISK ORDER |

*FIG. 19*

| | 4 BYTES | LV NUMBER |
|---|---|---|
| TABLE 1650 | 4 BYTES | SEGMENT SIZE |
| | 8 BYTES | SEGMENT COUNT 10000 |
| | 4 BYTES | QUALITY OF SERVICE |
| | 4 BYTES | RANGE COUNT 3 |
| 1624a | | INFORMATION FOR FIRST RANGE |
| | 4 BYTES | TYPE NORMAL |
| | 8 BYTES | START 7000 |
| | 8 BYTES | END 9999 |
| | 2 BYTES | NETWORK RAID LEVEL 5 |
| | 2 BYTES | NETWORK RAID SIZE 4+1 |
| | 2 BYTES | DISK RAID |
| | 2 BYTES | DISK RAID SIZE |
| 1624b SECOND RANGE ENTRY | 4 BYTES | DATA BANK COUNT 5 |
| | 4 BYTES | DATA BANK ORDER 4,2,1,3,5 |
| | 4 BYTES | DISK COUNT |
| | 4 BYTES | DISK ORDER |
| | | ○○○ |
| | 4 BYTES | DISK COUNT |
| | 4 BYTES | DISK ORDER |
| | 4 BYTES | TYPE NORMAL |
| | 8 BYTES | START 6000 |
| | 8 BYTES | END 6999 |
| | 2 BYTES | NETWORK RAID LEVEL 5 |
| | 2 BYTES | NETWORK RAID SIZE 5+1 |
| | 2 BYTES | DISK RAID |
| | 2 BYTES | DISK RAID SIZE |
| 1624e NEW RANGE ENTRY | 4 BYTES | DATA BANK COUNT 6 |
| | 4 BYTES | DATA BANK ORDER 1,6,2,3,4,5 |
| | 4 BYTES | DISK COUNT |
| | 4 BYTES | DISK ORDER |
| | | ○○○ |
| | 4 BYTES | DISK COUNT |
| | 4 BYTES | DISK ORDER |

FROM FIG. 20A

| | | |
|---|---|---|
| 4 BYTES | TYPE NORMAL | |
| 8 BYTES | START 5000 | |
| 8 BYTES | END 5999 | TABLE 1650 |
| 2 BYTES | NETWORK RAID LEVEL 5 | |
| 2 BYTES | NETWORK RAID SIZE 5+1 | |
| 2 BYTES | DISK RAID | |
| 2 BYTES | DISK RAID SIZE | |
| 4 BYTES | DATA BANK COUNT 6 | |
| 4 BYTES | DATA BANK ORDER 1,6,2,3,4,5 | |
| 4 BYTES | DISK COUNT | |
| 4 BYTES | DISK ORDER | |
| | ○ ○ ○ | |
| 4 BYTES | DISK COUNT | |
| 4 BYTES | DISK ORDER | |

1624d RANGE ENTRY

*FIG. 20B*

| | 4 BYTES | LV NUMBER |
|---|---|---|
| TABLE 1650 | 4 BYTES | SEGMENT SIZE |
| | 8 BYTES | SEGMENT COUNT 10000 |
| | 4 BYTES | QUALITY OF SERVICE |
| | 4 BYTES | RANGE COUNT 3 |
| 1624a | | INFORMATION FOR FIRST RANGE |
| | 4 BYTES | TYPE NORMAL |
| | 8 BYTES | START 7000 |
| | 8 BYTES | END 9999 |
| | 2 BYTES | NETWORK RAID LEVEL 5 |
| | 2 BYTES | NETWORK RAID SIZE 4+1 |
| | 2 BYTES | DISK RAID |
| | 2 BYTES | DISK RAID SIZE |
| 1624b SECOND RANGE ENTRY | 4 BYTES | DATA BANK COUNT 5 |
| | 4 BYTES | DATA BANK ORDER 4,2,1,3,5 |
| | 4 BYTES | DISK COUNT |
| | 4 BYTES | DISK ORDER |
| | | ○<br>○<br>○ |
| | 4 BYTES | DISK COUNT |
| | 4 BYTES | DISK ORDER |
| | 4 BYTES | TYPE SOURCE |
| | 8 BYTES | START 5000 |
| | 8 BYTES | END 6999 |
| | 2 BYTES | NETWORK RAID LEVEL 5 |
| | 2 BYTES | NETWORK RAID SIZE 5+1 |
| | 2 BYTES | DISK RAID |
| | 2 BYTES | DISK RAID SIZE |
| 1624f RANGE ENTRY | 4 BYTES | DATA BANK COUNT 6 |
| | 4 BYTES | DATA BANK ORDER 1,6,2,3,4,5 |
| | 4 BYTES | DISK COUNT |
| | 4 BYTES | DISK ORDER |
| | | ○<br>○<br>○ |
| | 4 BYTES | DISK COUNT |
| | 4 BYTES | DISK ORDER |

*FIG. 21*

| TABLE 2350 | | |
|---|---|---|
| | 4 BYTES | LV NUMBER |
| | 4 BYTES | SEGMENT SIZE |
| | 8 BYTES | SEGMENT COUNT 5000 |
| | 4 BYTES | QUALITY OF SERVICE |
| | 4 BYTES | RANGE COUNT 1 |
| 2324a RANGE | 4 BYTES | TYPE NORMAL |
| | 8 BYTES | START 0 |
| | 8 BYTES | END 4999 |
| | 2 BYTES | NETWORK RAID LEVEL 5 |
| | 2 BYTES | NETWORK RAID SIZE 2+1 |
| | 2 BYTES | DISK RAID |
| | 2 BYTES | DISK RAID SIZE |
| | 4 BYTES | DATA BANK COUNT 3 |
| | 4 BYTES | DATA BANK ORDER 2,3,1 |
| | 4 BYTES | DISK COUNT 12 |
| | 4 BYTES | DISK ORDER 2,4,3,1,5,6,8,7,9,11,10,12 |
| | 4 BYTES | DISK COUNT 12 |
| | 4 BYTES | DISK ORDER 11,7,6,2,3,4,9,8,10,5,1,12 |
| | 4 BYTES | DISK COUNT 12 |
| | 4 BYTES | DISK ORDER 5,7,6,11,12,3,4,9,8,10,5,2,1 |

*FIG. 23*

| TABLE 2450 | | |
|---|---|---|
| | 4 BYTES | LV NUMBER |
| | 4 BYTES | SEGMENT SIZE |
| | 8 BYTES | SEGMENT COUNT 5000 |
| | 4 BYTES | QUALITY OF SERVICE |
| | 4 BYTES | RANGE COUNT 1 |
| 2424 RANGE | 4 BYTES | TYPE NORMAL |
| | 8 BYTES | START 0 |
| | 8 BYTES | END 4999 |
| | 2 BYTES | NETWORK RAID LEVEL 5 |
| | 2 BYTES | NETWORK RAID SIZE 2+1 |
| | 2 BYTES | DISK RAID |
| | 2 BYTES | DISK RAID SIZE |
| | 4 BYTES | DATA BANK COUNT 3 |
| | 4 BYTES | DATA BANK ORDER 2,3,1 |
| | 4 BYTES | DISK COUNT 12 |
| | 4 BYTES | DISK ORDER 2,4,3,1,5,6,8,7,9,11,10,12 |
| | 4 BYTES | DISK COUNT 11 |
| | 4 BYTES | DISK ORDER 11,7,6,2,3,4,8,10,5,1,12 |
| | 4 BYTES | DISK COUNT 12 |
| | 4 BYTES | DISK ORDER 5,7,6,11,12,3,4,9,8,10,5,2,1 |

*FIG. 24*

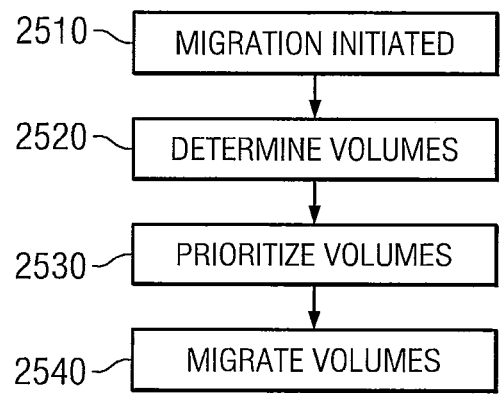

*FIG. 25*

METHOD AND SYSTEM FOR DATA MIGRATION IN A DISTRIBUTED RAID IMPLEMENTATION

RELATED APPLICATIONS

This application claims a benefit of priority under 35 U.S.C. §119 to provisional patent application Nos. 61/131,270 by inventors Galloway et al., entitled "Method and System for Distributed RAID Implementation" filed on Jun. 6, 2008; and 61/131,314 by inventors Galloway et al., entitled "Method and System for Data Migration in a Distributed Multi-Processor RAID Subsystem" filed Jun. 6, 2008; and 61/131,291 by inventors Galloway et al., entitled "System and Method for Distributing Read/Write Requests to Optimal SCSI Targets" filed Jun. 6, 2008; and 61/131,290 by inventors Galloway et al., entitled "Method and System for Utilizing Storage in a Storage System" filed Jun. 6, 2008; and 61/131,379 by inventors Galloway et al., entitled "Method and System for Rebuilding Data" filed Jun. 6, 2008; and 61/131,312 by inventors Galloway et al., entitled "Method and System for Placement of Data on Storage" filed Jun. 6, 2008; the entire contents of each are hereby fully incorporated by reference herein for all purposes.

TECHNICAL FIELD

This invention relates generally to the use of storage devices. More particularly, embodiments of this invention relate to implementing RAID on storage devices. Even more specifically, certain embodiments of this invention relate to a distributed implementation of RAID.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy, security, etc. These techniques may, however, conflict with other competing constraints or demands imposed by the state or configuration of computing devices used to process or store this data.

One method for dealing with these tensions is to implement a Redundant Array of Independent Disks (RAID).

Generally, RAID systems divide and replicate data across multiple hard disk drives (or other types of storage media), collectively referred to as an array, to increase reliability and in some cases improve throughput of computing devices (known as a host) using these RAID systems for storage. To a host then, a RAID array may appear as one or more monolithic storage areas. When a host desires to communicate (read, write, etc.) with the RAID system the host communicates as if the RAID array were a single disk. The RAID system, in turn, processes these communications to implement a certain RAID level in conjunction with such communications. These RAID levels may be designed to achieve some desired balance between a variety of tradeoffs such as reliability, capacity, speed, etc. For example, RAID (level) 0 distributes data across several disks in a way which gives improved speed and utilizes substantially the full capacity of the disks, but all data on a disk will be lost if the disk fails; RAID (level) 1 uses two (or more) disks which each store the same data, so that data is not lost so long as one disk survives. Total capacity of the array is substantially the capacity of a single disk and RAID (level) 5 combines three or more disks in a way that protects data against loss of any one disk; the storage capacity of the array is reduced by one disk.

Current implementations of RAID may have a variety of problems. These problems may stem from limitations imposed by the architecture of these RAID systems, such as the fact that in many instances all communications with a RAID system must be addressed to a single server which controls and manages the RAID system. Other problems may arise from the configuration or layout of the data on the disks comprising a RAID system. For example, in certain cases a RAID level must be chosen and storage allocated within the RAID system before the RAID system can be utilized. Thus, the initially chosen RAID level must be implemented in conjunction with the data stored on the RAID system, irrespective of whether that level of RAID is desired or needed. In many cases these existing problems may be exacerbated by the need to use custom hardware or software to implement these solutions, raising the costs associated with implementing such a solution.

Furthermore, in existing RAID systems the addition or removal of storage, the reconfiguration of the RAID level of various volumes or a variety of other occurrences may cause a significant disruption to the operation of the RAID system as it may be necessary to migrate or otherwise move data to different locations, or create additional data that was not previously extant, and these requirements may, in turn, necessitate that at least a portion of the RAID system, or data stored in that RAID system, be taken offline for a period of time. In the case of large volumes, the time period may be hours or days. Alternatively, and equally problematic, when new storage is added to these RAID systems this new storage may be considered separate and distinct from existing storage which, in turn, creates a dichotomy between original data stored in an original configuration and original storage area and data stored after reconfiguration of storage.

Consequently, it is desired to substantially ameliorate these problems.

SUMMARY

Embodiments of the systems and methods disclosed provide a distributed RAID system comprising a set of data banks. More particularly, in certain embodiments of a distributed RAID system each data bank has a set of associated storage media and executes a similar distributed RAID application. The distributed RAID applications on each of the data banks coordinate among themselves to distribute and control data flow associated with implementing a level of RAID in conjunction with data stored on the associated storage media of the data banks.

Specifically, in one embodiment, a volume with an associated RAID level may be created using the distributed RAID system. Each of the distributed RAID applications can then coordinate operations associated with data of that volume such that data associated with that volume or the implementation of the desired RAID level in conjunction with that volume may be stored on the multiple data banks of the distributed RAID system.

Certain embodiments may be operable to migrate a volume between configurations such that data comprising a volume or corresponding redundancy data, may be created or moved among the plurality of data banks or within a single data bank, etc. By coordinating the implementation of a level of RAID in conjunction with a volume by storing both data of the volume and data associated with the implementation of RAID on multiple data banks using similar distributed RAID applications executing on each of those data banks a number of advantages may be achieved. Namely, a migration process may handled relatively seamlessly such that a user's access to data of the volume may be minimally affected in response to a number of eventualities, including for example alterations to such a distributed RAID system, including the addition of new storage within a data bank, the failure or removal of storage within a data bank, the addition or removal of data banks, the alteration of a RAID level or RAID type of a volume, etc.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 5 is a block diagram of one embodiment of a table.
FIG. 7 is a block diagram of one embodiment of a table.

FIG. 16 is a block diagram of one embodiment of a table.
FIG. 17 is a block diagram of one embodiment of a table.
FIG. 18 is a block diagram of one embodiment of a table.
FIG. 19 is a block diagram of one embodiment of a table.
FIG. 20 is a block diagram of one embodiment of a table.
FIG. 21 is a block diagram of one embodiment of a table.

FIG. 23 is a block diagram of one embodiment of a table.
FIG. 24 is a block diagram of one embodiment of a table.
FIG. 25 is a flow diagram of one embodiment of a method for prioritizing volumes in a migration process.

DETAILED DESCRIPTION

Figure 1:
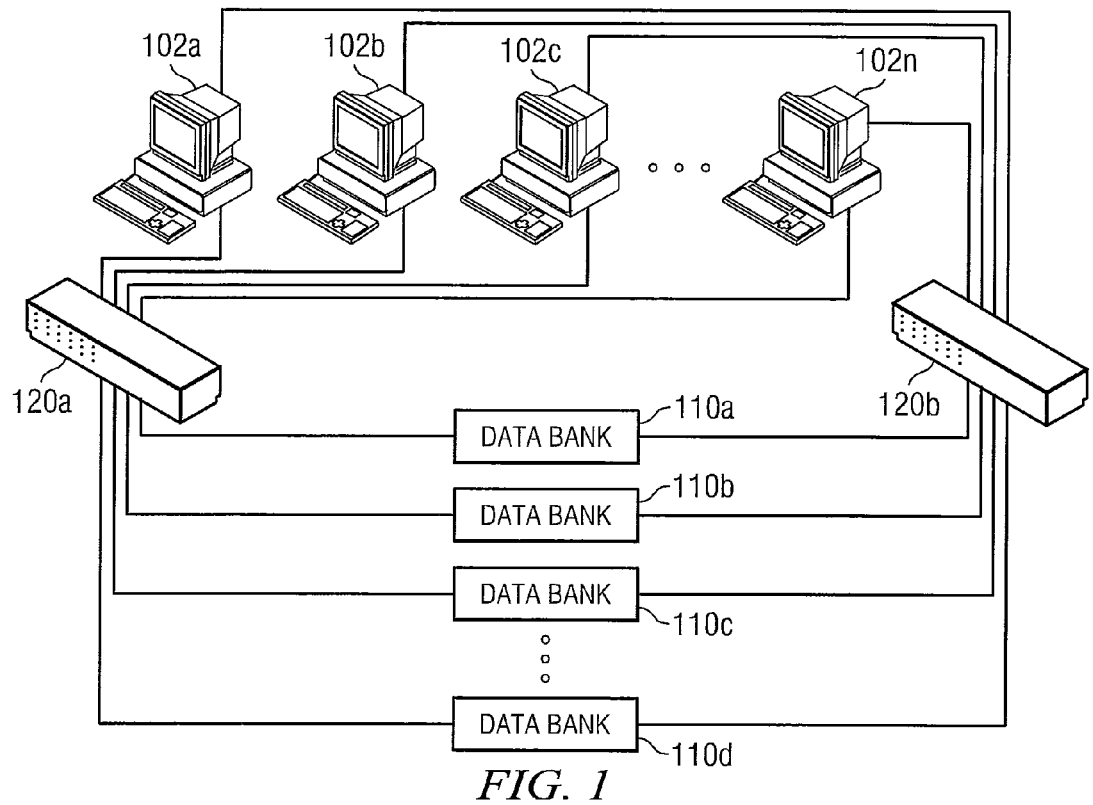
FIG. 1 is a block diagram of one embodiment of an architecture employing a distributed RAID system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU.

Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

This application is related to U.S. patent application Ser. Nos. 12/479,319 entitled "Method and System for Distributed RAID Implementation" by Galloway et al., filed on Jun. 5, 2009; Ser. No. 12/479,403, entitled "Method and System for Distributing Commands to Targets" by Galloway et al., filed Jun. 5, 2009; Ser. No 12/479,377, entitled "Method and System for Initializing Storage in a Storage System" by Galloway et al., filed Jun. 5, 2009; Ser. No. 12/479,434, entitled "Method and System for Rebuilding Data in a Distributed RAID System" by Galloway et al., filed Jun. 5, 2009; and Ser. No. 12/479,394, entitled "Method and System for Placement of Data on a Storage Device" by Galloway et al., filed Jun. 5, 2009 all of which are incorporated fully herein by reference.

A brief discussion of context particularly with respect to data storage may now be helpful. As discussed above, RAID systems divide and replicate data across multiple hard disk drives (or other types of storage media), collectively referred to as an array, to increase reliability and in some cases improve throughput of computing devices (known as a host) using these RAID systems for storage. However, current implementations of RAID may have a variety of problems. These problems may stem from limitations imposed by the architecture of these RAID systems, from the configuration or layout of the data on the disks comprising a RAID system, from the need to use custom hardware or software to implement these solutions or other problems. It is desired to substantially ameliorate these problems, among others.

To that end, attention is now directed to the systems and methods of the present invention. More specifically, embodiments of these systems and methods provide a distributed RAID system comprising a set of data banks. Particularly, in certain embodiments of a distributed RAID system each data bank has a set of associated storage media and executes a similar distributed RAID application. The distributed RAID applications on each of the data banks coordinate among themselves to distribute and control data flow associated with implementing a level of RAID in conjunction with data stored on the associated storage media of the data banks.

Specifically, in certain embodiments, a volume with an associated RAID level may be created using the distributed RAID system. Each of the distributed RAID applications can then coordinate operations associated with data of that volume such that data associated with that volume or the implementation of the desired RAID level in conjunction with that volume may be stored on the multiple data banks of the distributed RAID system.

Furthermore, alterations to such a distributed RAID system may be more easily dealt with. Specifically, the addition of new storage within a data bank, the failure or removal of storage within a data bank, the addition or removal of data banks, the alteration of a RAID level or RAID type of a volume or any of a number of other causes may entail the movement of data comprising a volume, movement of redundancy data corresponding to a volume, or the creation and placement of redundancy of data corresponding to a volume, or that data comprising a volume or redundancy data be created or moved among the plurality of data banks or within a single data bank (collectively referred to herein as migration).

This migration may be seamlessly accomplished without loss of access to the data of a volume by migrating a potion of a volume (and any associated redundancy data if necessary) at a time. Specifically, in one embodiment, the portion of a volume to migrated may be segregated from the remainder of the volume by creating a table describing the portion of the volume to be migrated in the source (original) format and a table describing the portion of the volume in the destination format (in other words, the format which that portion of the volume will have after the migration). These tables can then be used to handle any accesses to that portion of the volume during the actual migration of that portion (the movement or creation of any data associated with that portion).

By using these tables during the migration of data a number of advantages may be achieved. Namely, storage may be seamlessly added or removed, RAID levels or types changed, failures easily dealt with, etc. In addition, access to data being migrated may be substantially maintained during the process, increasing availability and reducing downtime. Many other advantages may also be realized utilizing embodiments presented herein or other embodiments, and such advantages, which may or may not be pointed out in particular detail, will be realized after reading this disclosure.

Turning now to FIG. 1, a block diagram of an architecture for a system which utilizes one embodiment of a distributed RAID system is depicted. Distributed RAID system 100 includes a set of data banks 110, each data bank 110 communicatively coupled to both of switches 120. Each of switches 120 is also communicatively coupled to each host 102, such that a host 102 may communicate with each data bank 110 through a set of paths corresponding to a particular data bank 110, each path comprising one of the switches 120.

The communicative coupling between data banks 110, switches 120 and hosts 102 may be accomplished using almost any transport medium (either wired or wireless) desired, including Ethernet, SCSI, iSCSI, Fibre Channel, serial attached SCSI ("SAS"), advanced technology attachment ("ATA"), serial ATA ("SATA") or other protocols known in the art. Furthermore, the communicative coupling may be implemented in conjunction with a communications network such as the Internet, a LAN, a WAN, a wireless network or any other communications network known in the art.

In one embodiment, then, using a commands protocol, such as iSCSI, SCSI, etc., hosts 102 may communicate with data banks 110 to manipulate data. More particularly, each of data banks 110 comprises storage media (as will be explained in more detail later on herein). Collectively, the storage media in data banks 110 may be virtualized and presented to hosts 102 as one or more contiguous blocks of storage, storage devices, etc. For example, when the iSCSI protocol is utilized the storage media in data banks 110 may be presented to hosts 102 as a SCSI target with, in one embodiment, multiple ports.

Thus, during operation, in one embodiment a host 102 (or a user at a host 102 or interfacing with data bank 110) may request the creation of a volume and specify a level of RAID to be implemented in conjunction with that volume. Data associated with that volume and the implementation of the desired level RAID in association with that volume is stored across data banks 110. The hosts 102 may then access this volume using logical address corresponding to the volume or a portion thereof. In this manner, hosts 102 can utilize created volumes of storage and fault tolerance can be achieved in conjunction with these volumes substantially invisibly to hosts 102.

Figure 2A:
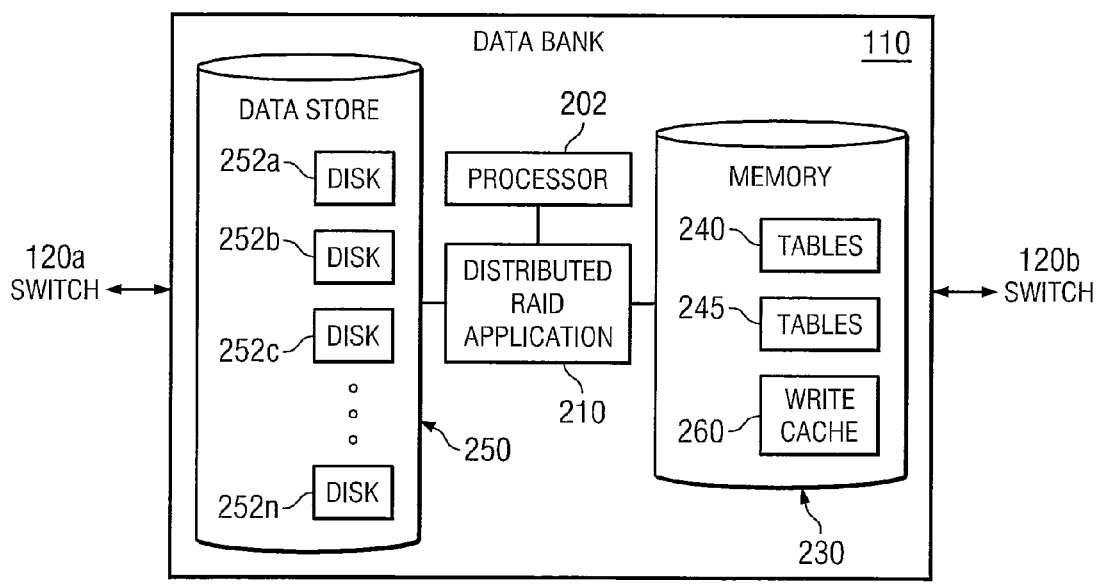
FIG. 2A is a block diagram of one embodiment of a data bank.

The virtualization of storage and the implementation of RAID utilizing data banks 110 may be better understood with reference to FIG. 2A which depicts a block diagram of one embodiment of a data bank 110 computer operable to implement distributed RAID. Here, data bank 110 comprises a data store 250, and a processor 202 operable to execute instructions stored on a computer readable medium, where the instructions are operable to implement distributed RAID application 210. Distributed RAID application 210 may periodically issue heartbeat communications to distributed RAID applications 210 on other data banks 110 to determine if there has been a fault with respect to that data bank 110. If the distributed RAID application 210 determines that another data bank 110 is experiencing a fault it may set one or more fault flags corresponding to that data bank 110. Using these fault flags for each distributed RAID application 210 on each data bank 110 a particular distributed RAID application 210 may determine if a certain data bank 110 is faulty.

Distributed RAID application 210 may also have access (for example, to read, write, issue commands, etc.) to data store 250 comprising one or more storage media, which may for example be disks 252 operating according to almost any protocol known, such as SATA, PATA, FC, etc. where each of the disks 252 may, or may not, be of equal size. Distributed RAID application 210, executing on each of data banks 110 can allow the allocation of and use of volumes using data stores 250 across data banks 110 and the implementation of RAID in conjunction with these volumes utilizing a set of global tables 240 shared between data banks 110, a set of local tables 245 and write cache 260, all of which may be stored in a memory 230 (which may be data store 250 or another memory altogether).

Figure 2B:
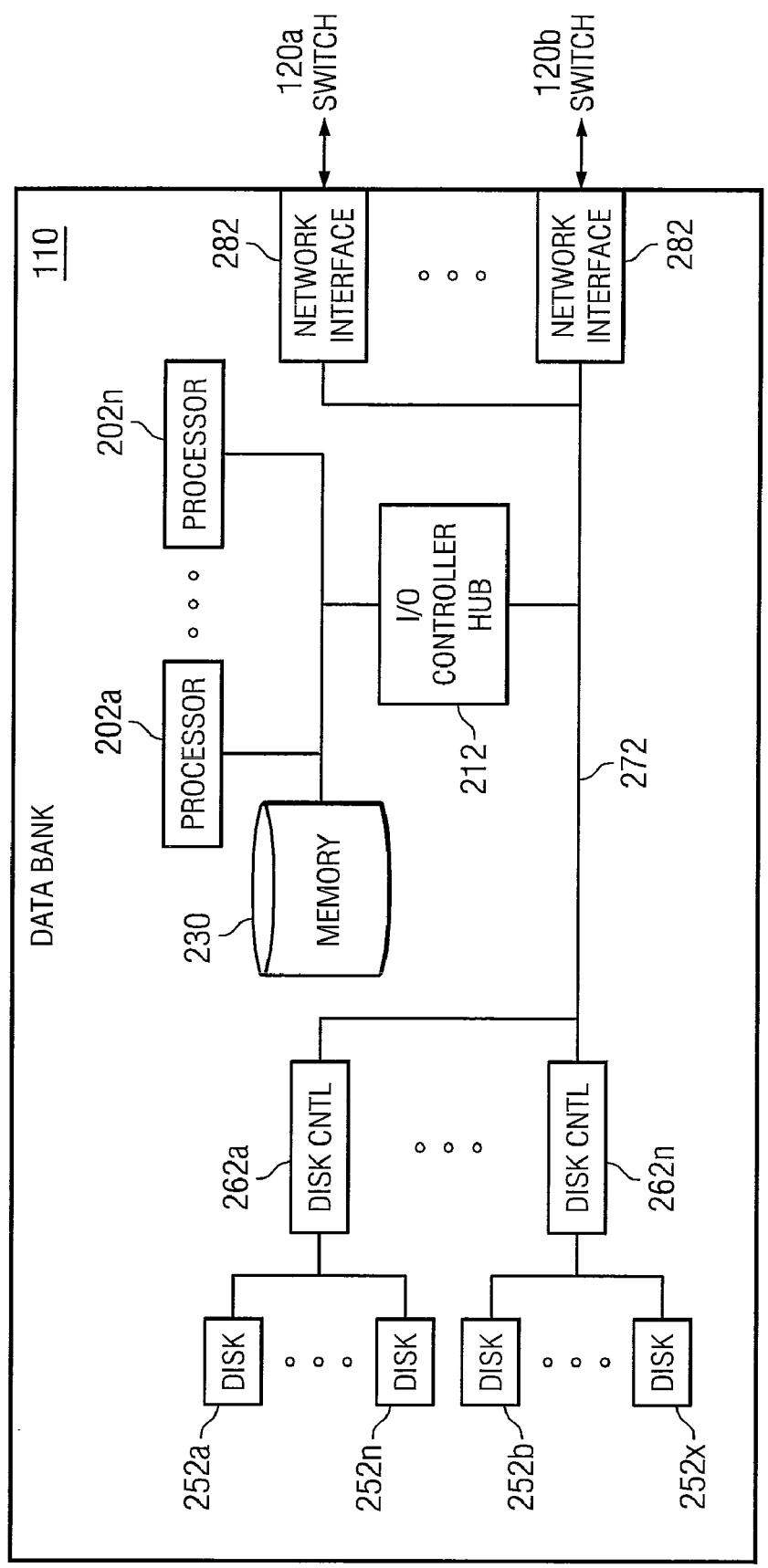
FIG. 2B is a block diagram of one embodiment of an architecture for a data bank.

FIG. 2B depicts a block diagram of one embodiment of a hardware architecture which may be used to implement data bank 110 computer operable to implement distributed RAID.

In this architectural example, data bank 110 comprises one or more processors 202 which may adhere to the Intel x86 architecture or some other architecture altogether and a memory 230 coupled through a bus to I/O controller hub 212, which in one embodiment may be a southbridge chip or the like. The I/O controller hub 212 may, in turn, be coupled to and control a bus 272 such as a PCI-X bus, PCI-express bus, etc. Coupled to this bus 272 are one or more disk controllers 262 such as, for example, an LSI 1068 SATA/SAS controller. Each of these disk controllers 262 is coupled to one or more disks 252, where collectively these disks 252 may comprise data store 250. Additionally, one or more network interfaces 282 may also be coupled to bus 272. These network interfaces 282 may be network interfaces (such as Ethernet, etc.) which are included on motherboards, may comprise one or more network interface cards configured to interface via one or more protocols such as Ethernet, fibre channel, etc. or may be some other type of network interface such that data bank 110 may communicate with switched 120 through these network interfaces 282.

Figure 3:
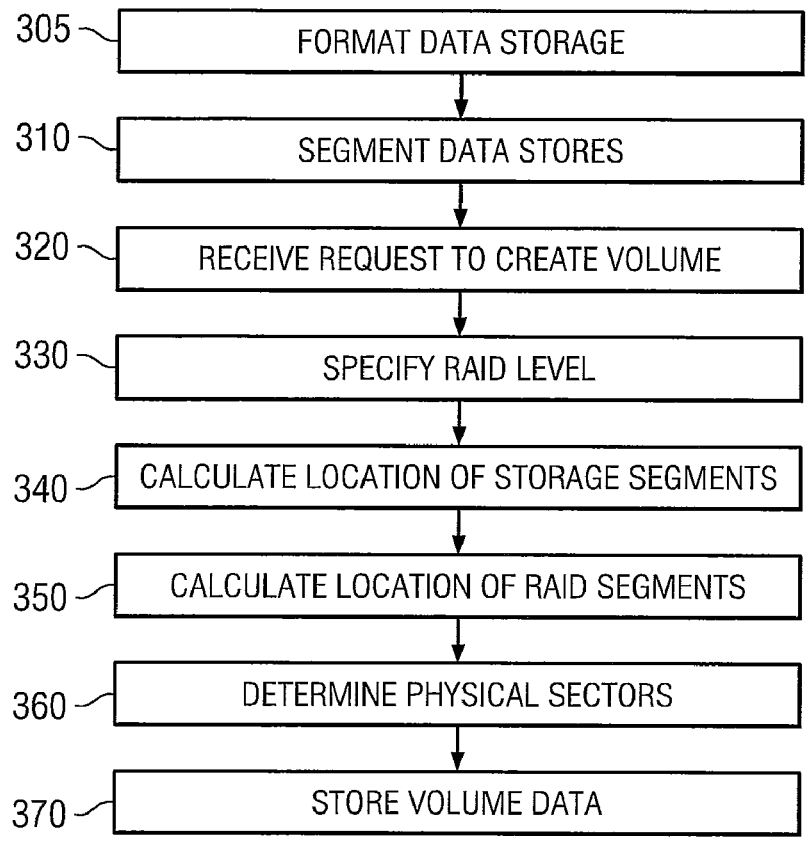
FIG. 3 is a flow diagram of one embodiment of a method implemented by a distributed RAID system.

Moving now to FIG. 3, one embodiment of a method for the allocation of volumes and the laying out of data associated with these volumes in data stores 250 across data banks 110 is illustrated. Initially, before volumes are to be allocated on a disk 252 of data store 250, the disk 252 may be formatted at step 305. As discussed above, in order to have the ability to easy and simply recover from any failures redundancy data may need to be accurate relative to any corresponding stored data. In many cases, this may entail that disks 252 utilized to store a volume be formatted by calculating redundancy data from the current data in the areas on disk 252 where portions of a volume are to be stored, even though data stored at these areas may currently be garbage values. These calculations may consume an undesirably large amount of time.

Furthermore, in a distributed RAID environment such as that detailed with respect to FIG. 1, other problems may present themselves. More specifically, as different portions of a volume may be stored on different data banks 110 and redundancy data corresponding to the volume may also be stored on various data banks 110, accomplishing this type of formatting may additionally require a great deal of communication between distributed RAID applications 210 on data banks 110, consuming processor cycles and communication bandwidth.

Thus, in one embodiment, to ensure that redundancy data corresponding to an area of a disk where data of a volume is to be stored is accurate relative to the area of disk 252 where that data of the volume is to be stored, a zero value may be written to the areas on disks 252 where data corresponding to the volume is to be stored and the areas on disk 252 where redundancy data is to be stored. By zeroing out both the areas of a disk 252 where data of a volume is to be stored and areas of disks 252 where redundancy data is to be stored it can be guaranteed that any data of the volume can be recreated from its corresponding redundancy data.

Zeroing disks 252 may have other advantages. Namely that no complex calculations may need to be performed to determine redundancy data and no communications between distributed RAID applications 210 may be to achieve relative accuracy between areas where a volume is to be stored and redundancy data corresponding to those areas.

Importantly, by zeroing out areas of disks 252 for use with a volume and its corresponding redundancy data a significant delay in the usability of RAID system 100 may be avoided. These advantages may be attained through the use of a process which substantially continuously during operation zeros out unallocated areas of disks 252 resulting, for example, from the initial use of distributed RAID system 100, the installation of new disks 252, the deletion of a volume, etc. In these instances, currently unallocated (i.e. not currently allocated) areas of disks 252 on each of data banks 110 may have zeros written to them (referred to as "zeroing" the area).

The unallocated areas of disks 252 which have been zeroed may be tracked such that when a command corresponding to a portion of a volume or redundancy data associated with a portion of a volume is received at a data bank 110 to which that portion is assigned, distributed RAID application 210 may check to determine if that portion has been assigned a corresponding area of disks 252 on data bank 110 where that portion has been assigned. If no corresponding area of disks 252 on data bank 110 has been assigned, distributed RAID application 210 may select an area of disks 252 which has been zeroed and assign this area of disks 252 to the portion of the volume or corresponding redundancy data.

By simultaneously zeroing out any unassigned areas which have not previously been zeroed and waiting until a command corresponding to a portion of a volume or redundancy data is received to assign a zeroed area of disks 252 to that portion distributed RAID system 100 may operate substantially immediately without a long involved formatting process and new disks 252 may be added and volumes deleted or freed relatively unobtrusively to the operation of distributed RAID system 100.

It will be noted, therefore, after reading the above that step 305 in which the disks 252 are formatted may be accomplished before, during or after the creation of a volume with respect to distributed RAID system 100 and that the placement of step 305 (and all other steps in all the flow diagrams herein) implies no order to the steps. As will also be noted after a thorough review of the rest of the steps in FIG. 3 and the remainder of the disclosure, a volume may be created and portions of the volume and redundancy data corresponding to the volume assigned to a data bank 110 before physical areas on disks 252 on these data banks 110 have been assigned to store the portions of the volume or redundancy data and that, furthermore, the zeroing of the physical areas on disks 252 used to store the data corresponding to such portions may occur before the creation of the volume or after the creation of the volume but before these physical areas are assigned to corresponding portions of the volume or redundancy data (as discussed in more detail later).

These locations may be better explained with reference to the concept of a segment which may be utilized by embodiments of a distributed RAID application 210, where a segment may be the size of 2048 logical block addresses (LBAs) (or some other size) and the size of the logical block address corresponds to the sector size of a disk 252. Disks 252 in the data store 250 on each of data banks 110 may therefore be separated into equal size segments (for example, 1 MB) at step 310. These segments may correspond to one or more contiguous data blocks of a disk drive 252. Therefore, when a user or host 102 requests the creation of a volume from distributed RAID application 210 at step 320 and specifies a level of RAID which will be used in conjunction with that volume at step 330, a number of these segments corresponding to the requested size of the volume plus the number of segments desired to implement the desired level of RAID in conjunction with the volume may be assigned to the volume at step 340.

Thus, the volume comprises a number of segments (also referred to as logical segments), where each of these segments may be associated with a particular data bank 110 such that the data bank 110 may be assigned to manage that segment of the volume. This segment may, for example, may be the size of 2048 logical block addresses (LBAs), where the size of the logical block address corresponds to the size sector size of a disk 252 (other arrangements and sizes will also be possible). In most cases the physical storage comprising that segment of the volume will be stored in the data store 250 of the data bank 110 which manages that segment, however, in other cases the data corresponding to that segment may be stored in the data store 205 of a different data bank 110 (in other words, in certain cases the data bank 110 comprising the distributed RAID application which manages that segment may be distinct from the data bank 110 comprising the data store 250 which stores the data corresponding to that segment).

In one embodiment, the allocation of segments to data banks 110 corresponding to a particular volume may be accomplished by determining a random permutation of the set of data banks 110 corresponding to the distributed RAID system 100. Thus, if there are six data banks a random permutation of size six, where the random permutation comprises each of the data banks may be determined such that the segments may assigned to each of the data banks consecutively in the order of the random permutation.

For example, suppose there are four data banks 110 in a distributed RAID system (call them data bank1, data bank2, etc.). A random permutation of data bank2, data bank4, data bank1 and data bank3 may be determined. In this case, the first segment corresponding to a volume is on data bank2, the second segment may be on data bank4, the third on data bank1, the fourth on data bank 3 and the fifth back again on data bank 4. In this way, the location of a particular segment corresponding with the volume may be determined mathematically if the random permutation corresponding to the volume is known.

As mentioned the user may specify that a level of RAID is to be implemented in conjunction with a volume at step 330. In this case, distributed RAID application 210 may ensure that any data corresponding to the implementation of RAID in conjunction with a volume is stored at an appropriate location at step 350 such that the RAID information is appropriately distributed across data banks 110 to ensure that the desired level of RAID is achieved.

For example, if it is desired to implement RAID 5 in conjunction with a volume, distributed RAID application 210 may determine a desired RAID parity group size (for example, based on a user configured RAID set or otherwise determined). This determination may be based on the number of data banks 110 in the distributed RAID system and may, in one embodiment, be one less than the number of data banks 110 (plus an additional one to account for the parity data).

To illustrate, if there were five data banks 110, for every four segments which store data associated with the volume (referred to as data segments), one segment would be dedicated to parity and the parity for the four segments calculated and stored in this parity segment, where the parity segment would be dedicated in a data bank 110 whose data store 250 does not comprise the data segments from which the parity data of the parity segment was calculated.

At this point, each segment corresponding to a logical volume has been assigned to a particular data bank 110 and any segments 100 to be utilized to store RAID data corresponding to the volume (referred to herein interchangeably as redundancy segments or parity segments, without loss of general applicability to the use of the segment to store any type of redundancy data associated with the implementation of any level of RAID in conjunction with a volume) have also been assigned to a data bank 110, however, physical sectors of the disks 252 of the data stores 250 of the data banks may not have yet been assigned to store the data corresponding to those segments. Thus, at step 360 physical segments of disks 252 on the data bank 110 to which a logical segment of the volume has been assigned may be determined and assigned to the logical segments. This segment mapping may be stored in the local tables 245 of each data bank 110. This assignment may, as mentioned earlier, take place at some later point, for example, when a command first attempts to write a logical segment.

When making this assignment, in one embodiment the areas different performance characteristics of disks 252 may be accounted for relative to the accessed logical segment.

In other words, disks 252 may have segments which are more efficiently accessed than other segments of the same disk. Therefore, in one embodiment it may desirable to assign physical segments of a disk 252 based upon criteria associated with the logical segment. The characteristics may include for example, such things as a quality of service designation associated with a volume corresponding to the logical segment, a number of accesses to the volume comprising the logical segment, etc.

At step 370, then, information corresponding to the volume may be stored, such that the location of segments corresponding to the volume, or segment corresponding to the implementation of RAID in conjunction with the volume, may be determined from this stored information.

This stored information (collectively referred to as mapping data) may therefore include an identification for the volume, the random permutation corresponding to the volume (for example, indicating the order of data banks 110 on which the segments are located) and the parity group size of any RAID implementation (for example, if the volume corresponds to a 4+1 RAID set, a 7+1 RAID set, if RAID 1 is implemented, etc.). This data may be stored, for example, in global tables 240 such that it can be communicated to other distributed RAID applications 210 on other data banks 110 to ensure that at least a portion of the set of tables 240 associated with each distributed RAID application 210 remains substantially consistent and the location.

Figure 4:
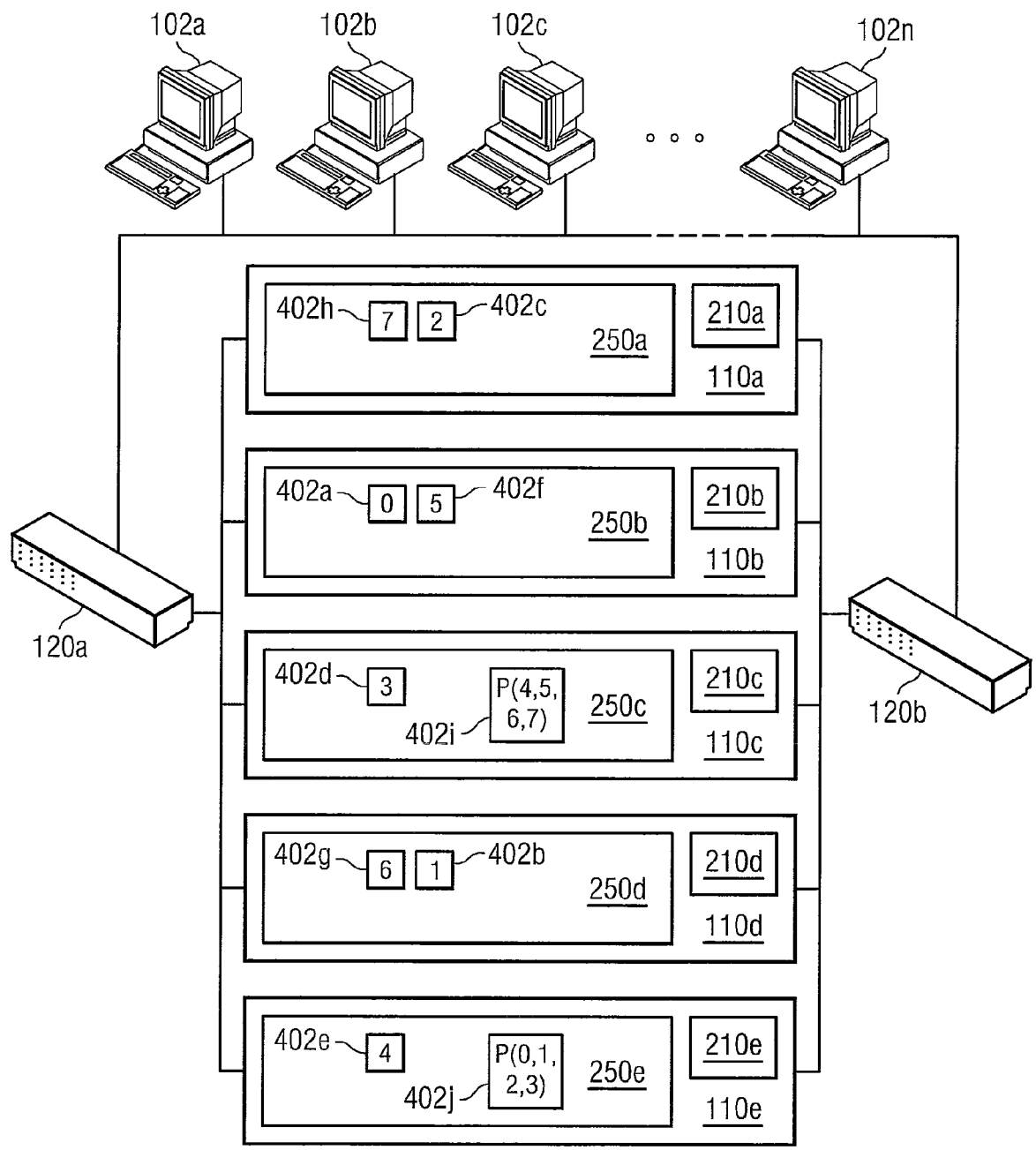
FIG. 4 is block diagram of an example of one embodiment of an architecture employing a distributed RAID system.

The above description may be better understood with reference to FIG. 4 which depicts one example of one embodiment of a distributed RAID system with five data banks 110. Here, each data store 250 of each data bank 110 has been laid out as a set of equally sized segments 402, which for purposes of this example will be assumed to be 1 MB in size. Suppose, now that a host 102 requests a volume of 8 MB with RAID level 5 from distributed RAID application 210b on data bank 110b. In this case, distributed RAID application 210b may determine that eight segments 402 are required for the data portion of the volume while two segments 402 segments may be required to store the redundancy data for the volume in conjunction with implementation of the desired RAID level for the volume. Distributed RAID application 210b may then determine a random permutation for the volume. For purposes of this example, assume that the random permutation is: data bank 110b, data bank 110d, data bank 110a, data bank 110c, and data bank 110e. Thus, data bank 110b may be assigned segment 402a, the first segment of the requested volume, data bank 110d may be assigned segment 402b, the second segment of the requested volume, data bank 110a may be assigned segment 402c, the third segment of the requested volume, data bank 110c may be assigned segment 402d, the fourth segment of the requested volume and data bank 110e may be assigned segment 402e, the fifth segment of the requested volume.

The assignment then begins again with the first data bank 110 of the random order such that data bank 110b may be assigned segment 402f, the sixth segment of the requested volume, data bank 110d may be assigned segment 402g, the sixth segment of the requested volume and data bank 110a may be assigned segment 402h, the eighth segment of the requested volume.

Once the data segments 402a-402h for storing data associated with the volume have been assigned, distributed RAID application 210b may assign segments 402 for any data associated with the implementation of that RAID level. In this example, as RAID 5 is desired with respect to the volume, distributed RAID application 210b may determine that as five data banks 110 are being utilized a (4+1) parity set may be desired. Distributed RAID application 210b may then determine that to store the parity to implement RAID 5 in conjunction with eight segments 402 an additional two segments 402 may be needed.

Furthermore, it may be desired that the parity created utilizing a particular set of data segments 402 will not be stored on a data bank 110 having any of those set of data segments 402 in its data store. Thus, distributed RAID application 210b may also determine a location where each of the parity segments will be allocated based on the determined RAID parity group size, the location of the first data segment 402a, etc. Here, parity segment 402i which will store the parity data corresponding to the data stored in data segments 402a, 402b, 402c and 402d will be allocated in data store 250c of data bank 110c while parity segment 402j which will store the parity data corresponding to the data stored in data segments 402e, 402f, 402g and 402h will be allocated in data store 250e of data bank 110e. Notice here that the parity segments 402i, 402j which will store the parity information associated with the implementation of RAID in conjunction with the volume comprising data segments 402a-402h are laid out and sized substantially identically to as those segments 402a-402h which store the data associated with the volume.

Thus, when a host 102 accesses the volume, a request with a logical address corresponding to the first data segment of the volume may correspond to data segment 402a on data bank 110b, a request with a logical address corresponding to the second data segment of the volume may correspond to data segment 402b on data bank 110d, etc. Notice here, that the allocated data segments 402a-402h may reside on different data banks 110 and that the location of any allocated data segment 402a-402h may be determined using the random permutation associated with that volume (for example, as stored in global tables 240 at data banks 110). As discussed above, however, data stores 250 on data banks 110 have been virtualized, thus the requesting host may not be aware of the location of the data segments 402 in data stores 250, that multiple data stores 250 exist, that data stores 250 are spread across multiple data banks 110, etc. Host 102 believes it is addressing a single contiguous volume.

It will be apparent that the location of the data segments 402 on data banks 110 (and the corresponding random permutation of data banks 110) in this example is for purposes of illustration and that the data segments 402 of a volume may be located on any of data stores 250 on any of the data banks 110 according to almost any random, or other, permutation. Furthermore, it will be noted that while each of segments 402 is in this example 1 MB, these may be of any size without loss of generality and that a 1 MB size has been chosen solely for ease of illustration.

As can be seen from the above description then, the location of a particular data segment 402 or parity segment 402 can be determined algorithmically (for example, using the same random permutation used to assign segments for the volume, locate the parity segments for the volume, etc.) using the random permutation associated with the volume and the RAID parity group size. Thus, the information may be stored in conjunction with an identification corresponding to the volume, for example in set of global tables 240. Furthermore, these global tables 240 may be communicated between data banks 110, or otherwise updated, such that at least portions of the set of global tables 240 in each of the data banks 110 may be kept substantially consistent.

It may be helpful here to briefly delve into more detail regarding global tables 240 associated with distributed RAID application 210. As discussed, in one embodiment, global tables 240 may store information associated with volumes created by distributed RAID application 210 where those tables 240 can be used to determine a data bank 110 associated with a data segment within that volume or where a parity segment associated with a data segment corresponding to that volume is located. Global tables 240 may therefore comprise a set of tables, each table corresponding to a volume implemented with respect to databanks 110. In particular, one of these tables 240 may contain data which may be used to identify a data bank 110 whose data store 250 comprises a certain segment of a volume. Specifically, this table may be used to correlate a logical address associated with a volume with the data bank 110 where the segment (data, redundancy, etc.) corresponding to that logical address is stored.

FIG. 5 depicts a graphical representation of one embodiment of this type of table, where each volume may have an associated instance of such a table associated.

Table 550 includes entries for LV number 504, segment size 508, segment count 512, quality of service (QOS) 514, range count 518, information for range entries, including in the embodiment depicted a first range 524a and a second range 524b and any additional range entries 524n.

LV number 504 is a unique number used to identify a particular volume, segment size 508 corresponds to the size of the segments used to implement the volume, segment count 512 corresponds to the number of segments corresponding to the logical volume (for example, both the number of data segments and redundancy segments, just the number of data segments, etc), QOS 514 indicates the quality of service which it is desired to implement with respect to the volume (note that this QOS indicator may indicate a priority to be given to that volume relative to other volumes stored on data banks 110) and range count 518 indicates a number of ranges associated with the volume, while range entries 524 each correspond to one of those ranges.

A range may correspond to a particular data bank 110 order and RAID implementation. Multiple ranges may be utilized to implement a volume for a variety of reasons. Specifically, for example, multiple ranges may be utilized in conjunction with a volume because different data stores 250 at different data banks 110 may have different amounts of storage in data store 250 available for use. This may lead to a situation where for example, for a first range of a volume all data banks 110 may be utilized in conjunction with a first RAID implementation while in a second range of a volume fewer than all the data banks 110 available may be utilized in conjunction with a second RAID implementation (where the first and second RAID implementations may, in fact, be different levels than one another). Each of these ranges may therefore correspond to segments laid out according to different data bank 110 orders (for example, random permutations, etc.), having a different number of data banks 110 available for use, a different type of RAID, etc.

To illustrate using a concrete example, brief reference is made back to FIG. 4. Suppose that the volume of 8 MB with RAID level 5 is laid out as shown, where the data segments are laid out according to the order data bank 110b, data bank 110d, data bank 110a, data bank 110c, and data bank 110e and RAID 5 is implemented in conjunction with the volume utilizing a (4+1) parity set may be desired with the parity segments assigned in data store 250c of data bank 110c and data store 250e of data bank 110e.

Now suppose that it is requested to add an additional 3 MB to this volume. However, suppose in this instance that data stores 250 of data banks 110e, 110c and 110d have no more room. Thus, in this case the only solution may be to allocate the additional desired 3 MB between data banks 110a and 110b which have remaining storage in data stores 250. Furthermore, as only two data banks 110 may be available for use it may only be possible to utilize a RAID level of 1 instead of RAID 5 as utilized with the first 8 MB of the volume. Thus, in this case the first 8 MB of the volume may correspond to a first range, and have a first range entry in a table corresponding to the volume with a first set of values while the next 3 MB of the volume may correspond to a second range, and have a second range entry in a table corresponding to the volume with a second set of values. As may be apparent after reading this disclosure, this type of occurrence may occur with some frequency.

Returning to FIG. 5, to deal with these types of situations, among others, each range of a volume may have an entry in a table 550 such that the location of segments in that particular range may be determined from the range entry corresponding to that range. Entries 524 for each of the ranges of the volume corresponding to the table 550 are associated with range count 518. In one embodiment, range count 518 may correspond to the number of ranges of a volume such that the number of range entries 524 corresponds to the range count 518. While only range entries 524a and 524b are shown it will be noted that the number of range entries 524 in a table will depend on the number of ranges corresponding to the volume to which that table corresponds. Thus, if a volume is divided into three ranges, there will be three range entries 524 in table 550 such that there is a range entry 524 comprising information for each range of the volume corresponding to table 550.

Information for a range entry 524 includes type 526, start 530, end 534, network RAID 538, network RAID size 542, disk RAID 546, disk RAID size 550, databank count 554, databank order 558 and a disk count 562 and disk order 566 corresponding to each data bank 110 used to store segments associated with range 524 (in other words there will be a disk count 562 and disk order 566 equal to databank count 554 of that range entry 524). Type 526 describes the type of the range corresponding to information for range entry 524: for example, normal, source (SRC), destination (DST) or other type of range.

Start 230 is the first logical segment address of the range of the volume corresponding to range entry 524. End 234 is the last logical segment address of the range corresponding to information for the range of the volume corresponding to range entry 524. Other arrangements are also possible, for example, end 524 may be a count which is the maximum number of segments or blocks in the range, etc.

Databank count 554 may correspond to the number of data banks 110 on which the range corresponding to the range entry resides, databank order 558 may be the order in which segments in that range were assigned to data banks 110 while network RAID 538, network RAID size 542, disk RAID 546 and disk RAID size 552 may correspond to the type of RAID implemented in conjunction with the range of the volume corresponding to range entry 524.

Network RAID 538 is the type of RAID being implemented in association with the volume corresponding to the table 550, for example, RAID 0, RAID 1 or RAID 5 or other RAID types. Network RAID Size 542 is the parity group size of the RAID type used in the range. The Network RAID Size 542 may be limited by the number of data banks 110 in the range to be less than or equal to the number of databanks in the range corresponding to information for range 524.

Disk RAID 546 is the type of RAID being implemented across disks in the databanks in the range. Disk RAID size 552 may be the parity group size of the RAID type used across the disks 252 in the data store 250 of each data bank 110 and may be limited to be less than or equal to the number of disks in the databank. In embodiments, RAID across the disks in the databanks 110 in the range is optional and may or may not be used. In such embodiments, either Disk RAID 546, Disk RAID Size 552 or both may not be used or may be omitted.

Data bank count 554 is the number of databanks in the range and Databank order 558 is the order in which RAID is implemented (for example, striped) across the data banks 110 in the range. For example, data banks 110 may have data corresponding to the logical addresses of the volume saved in a certain order and databank order 558 corresponds to this order. Disk count 562 is the number of disks within a data bank 110 of the range and disk order 566 is the order in which RAID is implemented across disks of a particular databank 110. For example, disks 252 may have segments saved to them in a certain order and disk order 566 is the order in which segments are stored across disks 252 in a data bank 110. Thus, for each databank 110 used to store segments of the range associated with the range entry 524 there will be a corresponding disk count 562 and disk order 566 (in other words the number of disk counts 562 and disk orders 566 will, in one embodiment, be equal to databank count 554 of that range entry 524) In embodiments, RAID across disks 252 in the data banks 110 is optional and may not be used. It will be noted that while table 550 has been described with specificity, this description is by way of example, not limitation and other forms of table 550 may be utilized. For example, a virtual table may be used instead of table 550 and may explicitly list the segment 402 and data bank 110 corresponding to each logical address.

Thus, as discussed earlier, information in table 550 may be used to identify a data bank 110 comprising a data segment 402 corresponding to a logical address (referenced by a host 102 in a command or in any other context). For example, knowing the size of segments 402 and using start 530, end 534, the range entry 524 corresponding to the address, etc., the particular data bank 110 corresponding to a logical address of the volume can be determined.

While one or more portions of tables 240 may be substantially identical across all data banks 110 and may describe one or more logical volumes which span one or more data banks 110 as described above, other tables 245 on a data bank 110 may be distinct to the data bank 110 to which it corresponds (for instance, table 245 may be unique to the data bank 110 on which the corresponding distributed RAID application 210 is executing). This table 245 may comprise data pertaining to each disk 252 contained in the data store 250 of the corresponding data bank 110 and may comprise information on where information is stored on or among disks 252 of the data store, for example, the sector of a disk 252 where a segment 402 assigned to the data bank 110 is located in data store 250.

Figure 6:
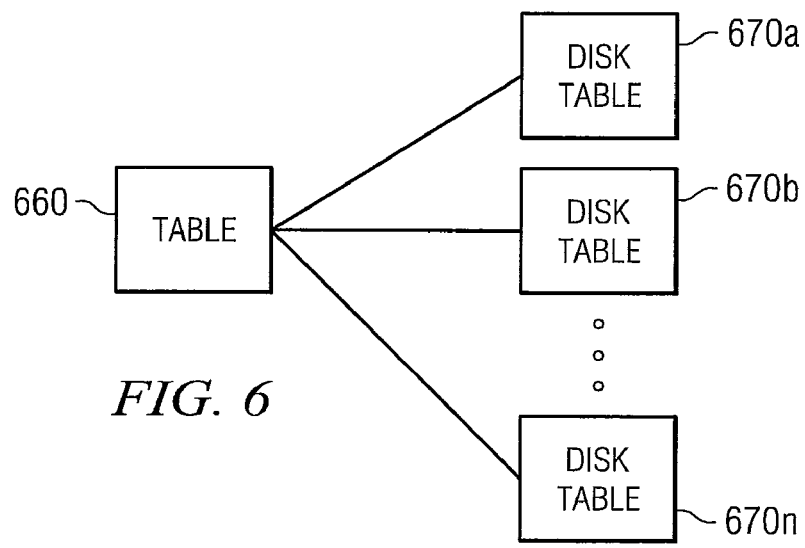
FIG. 6 is a block diagram of one embodiment of a table.

In FIG. 6 a graphical representation of one embodiment of this type of table is depicted. Table 660 may be stored at a particular data bank 110 and comprise multiple disk tables 670, each of the disk tables 670 corresponding to a disk 252 of the data store 250 within that data bank 110 and listing the location of the segments stored within that disk 252. More specifically, in most cases disks 252 are divided into physical sectors, each physical sector having a corresponding address or range of addresses.

A disk table 670 may be a mapping table which can be utilized to determine the location of a sector of a disk 252 of the data bank 110 where a segment of a volume is stored. Thus, using a table 670 the address of a sector on a disk 252 corresponding to a segment of a volume can be determined. Furthermore, the table may contain one or more flags or descriptive bits per entry corresponding to a segment or sector of the disk, describing the sector or segment stored at that sector.

Referring now to FIG. 7, a graphical representation of one embodiment of a disk table 670 is depicted. Disk table 670 has multiple entries, each entry corresponding to a physical segment of the corresponding disk such that the entries of disk table 670 describe the physical segments of the disk 252. Each entry in disk table 670 may also include one or more flags or bit fields describing the physical segment or segment of the volume stored at the corresponding sector. More particularly, as shown in FIG. 7, in one embodiment entries in disk table 670 include fields for a logical volume (LV) number, logical segment number, address space and sector state. LV number identifies the logical volume to which data stored at that physical segment corresponds. Logical segment number identifies the segment of the logical volume corresponding to that data. Address space identifies the segment stored as 'data' or 'redundancy'. A value of 'data' may indicates that data is stored at the sector represented by the entry, whereas a value of 'redundancy' indicates that the information stored at the sector may be used for RAID data protection and, depending upon the RAID level, may be redundant data, mirrored data or parity information. Sector state indicates the state of the segment as being 'allocated', 'zeroed' or 'dirty'. 'Allocated' indicates the segment has been allocated and may comprise valid data. 'Zeroed' indicates the segment has been zeroed out by writing zeros to the segment and 'dirty' indicates the segment may comprise garbage are otherwise unusable or undesirable values, for example because the segment has not been zeroed out or allocated, may be storing random bits or data. In one embodiment, for example, for a new disk all segments of the disk may be marked as dirty in a disk table corresponding to the new or newly added disk.

After reading the above description of the tables it will be apparent that distributed RAID application 210 may utilize the global tables 240 to determine which segment corresponds to a logical address of a volume, on which data bank 110 segments corresponding to a volume (either data or redundancy segments) are located, which segment of a volume corresponds to a logical address of a volume, where RAID data (parity data, mirror data, other types of redundancy data, etc.) associated with a segment of a volume is located, which disk 252 on a particular databank 110 comprises a segment or other information regarding volumes, segments, or disks 252 corresponding to that particular data bank 110 or other information regarding volumes, segments 402, data banks 110, RAID data, etc.

Similarly, distributed RAID application 210 on each individual data bank 110 may use local tables 245 on that data bank 110 to determine where on that data bank 110 (which sector(s) of disk 252, etc.) a particular segment is located or other information regarding volumes, segments, or disks 252 corresponding to that particular data bank 110.

Using the combination of the global table 240 shared between data banks 110 and the local tables 245 corresponding to each individual data bank 110 then, certain operations may be performed by the distributed RAID applications 210 on data banks 110 in cooperation with one another. These types of operations will now be discussed in more detail. Specifically, one embodiment of the implementation of a READ command and a WRITE command on a volume where RAID level 5 has been implemented in conjunction with the volume will now be discussed in more detail followed by concrete examples of the implementation of these commands with respect to an example distributed RAID system. It will be noted how other types of embodiments, commands, RAID levels, etc. may be implemented after a thorough review of this disclosure.

Figure 8:
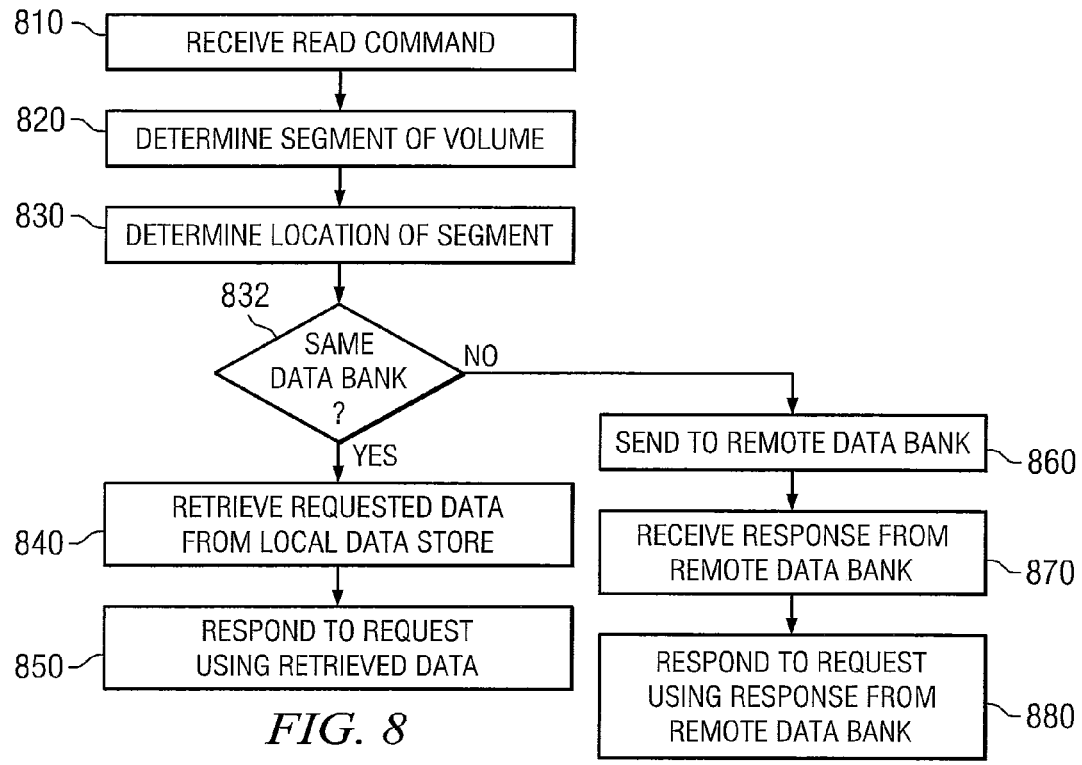
FIG. 8 is a flow diagram of one embodiment of a method implemented by a distributed RAID system.

Looking first at FIG. 8, a flow diagram for one embodiment of a method for implementing a READ command in a distributed RAID system is depicted. This READ command may be sent by a host 102 to a data bank 110 through a switch 120 or from one data bank 110 to another data bank 110. In certain embodiments, host 102 may comprise one or more applications and associated routing information such that a READ command may be routed from the host 102 issuing the command to an appropriate data bank 110 along a path between the issuing host 102 and the appropriate data bank 110. In other cases, however, no such application or routing information may be present on host 102 and thus a READ command issued from a host 102 may be routed to any of data banks 110. It is the latter case that will be illustrated in this embodiment. After reviewing the description of this embodiment, however, it will be noted by those of skill in the art which steps are applicable to the former case as well.

At step 810, then, a READ command may be received at a data bank 110. The distributed RAID application 210 on data bank 110 may determine, at step 820, a segment of a volume which corresponds to a logical address referenced in the received READ command and on which data bank 110 the segment of the volume is stored at step 830. As discussed above, this information may be determined using the global tables 240 associated with the distributed RAID application 210. If the data bank 110 which is storing the segment is the same as the data bank 110 which received the READ command (as determined at step 832) the requested data can be obtained from the appropriate disk 252 of the data store 250 on the receiving data bank 110 at step 840 and at step 850 the READ command responded to. As discussed above, the particular disk 252 of a data store 250 of the data bank 110 on which a segment is stored can be determined using global tables 240 while the location on that disk 252 where the data corresponding to the segment is stored may be determined using local tables 245 which may be used to map a segment of a volume to a physical location on a disk 252. If the receiving data bank 110 received the READ command from the host 102 the host 102 may be responded to while if the receiving data bank 110 received the READ command from another data bank 110 the response may be sent to the distributed RAID application 210 on the data bank 110 which issued the READ command.

If, however, the segment is stored on a remote data bank 110 (a data bank 110 other than the one which received the command) at step 860 the READ command may be sent to the distributed RAID application 210 at the remote data bank 110. In one embodiment, this READ command may be communicated to the distributed RAID application 210 at the remote data bank 110 using a command format utilized by distributed RAID application 210. This command, while providing pertinent information of the original READ command may also instruct the distributed RAID application to return the result of the READ command to the data bank 110 which originally received that READ command, or to perform other functionality. Accordingly, after the READ command is sent to the remote data bank 110 at step 870 a response comprising the requested data may be received from the remote data bank 110 and at step 880 the received READ command responded to using the data received in that response.

Figure 9A:
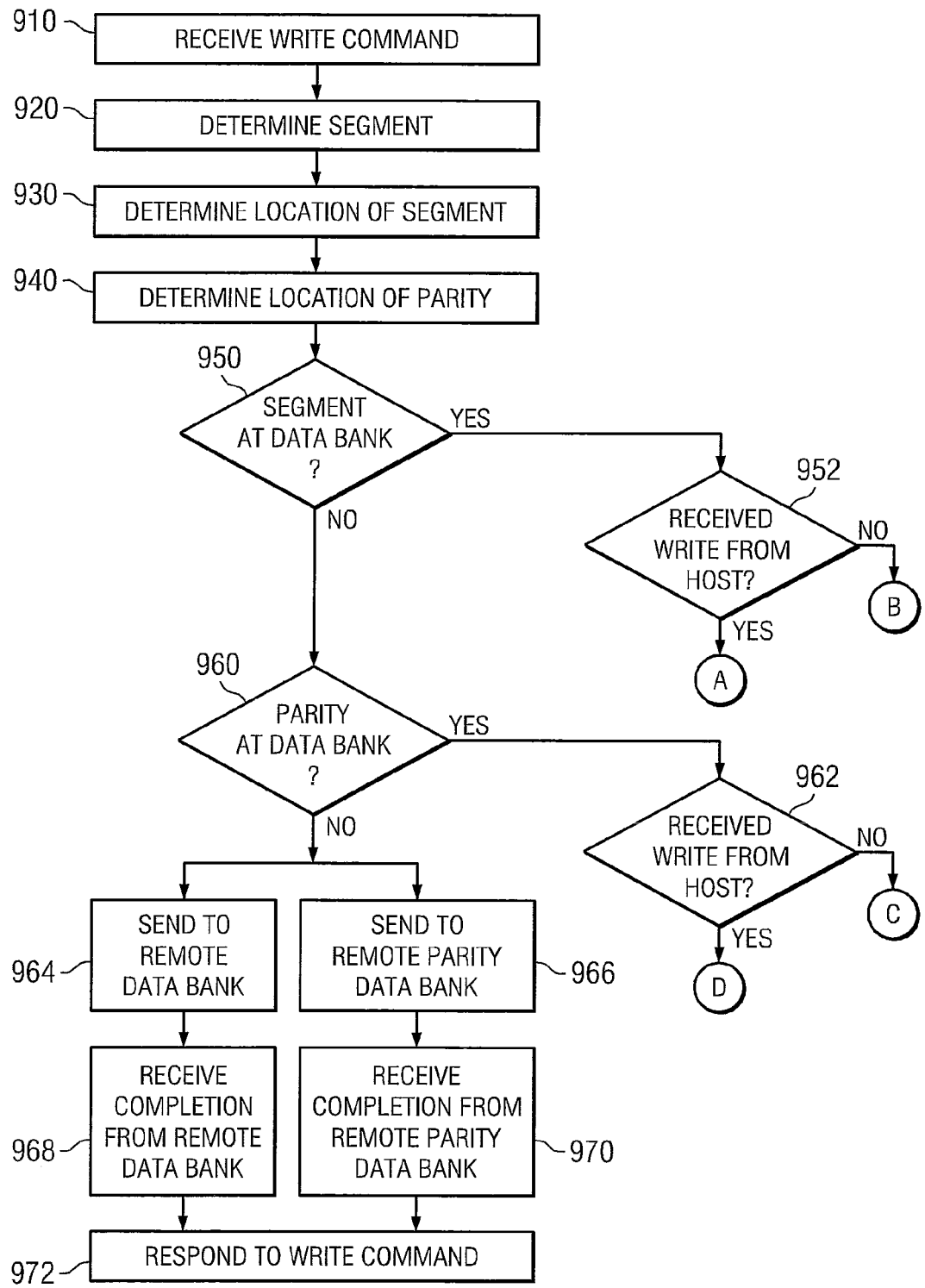
FIG. 9A is a flow diagram of one embodiment of a method implemented by a distributed RAID system.
Figure 9B:
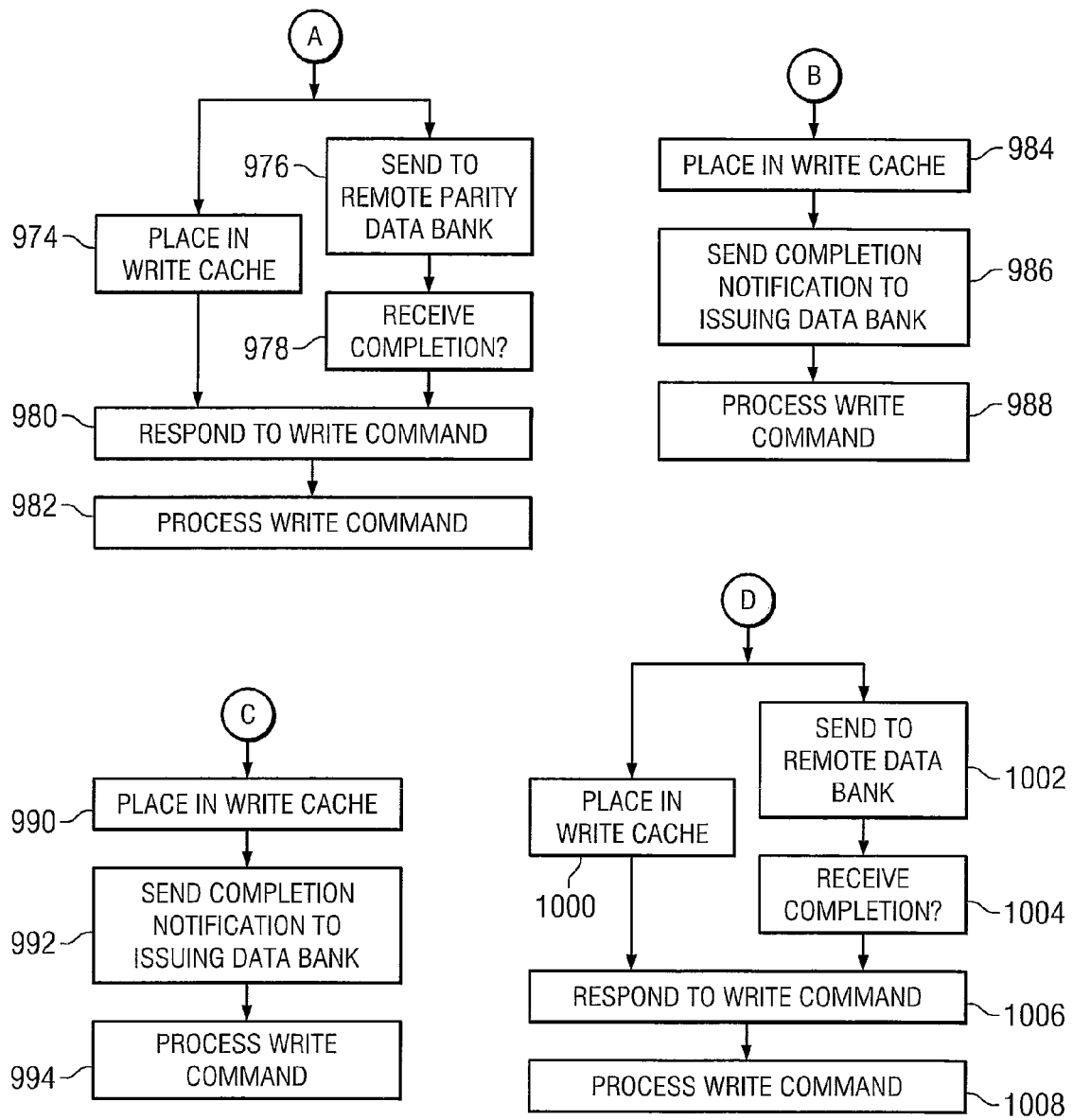
FIG. 9B is a flow diagram of one embodiment of a method implemented by a distributed RAID system.

Moving, now to FIGS. 9A and 9B, a flow diagram for one embodiment of a method for implementing a WRITE command in a distributed RAID system is depicted. This WRITE command may be sent by a host 102 to a data bank 110 through a switch 120 or from one data bank 110 to another data bank 110. In certain embodiments, host 102 may comprise one or more applications and associated routing information such that a WRITE command may be routed from the host 102 issuing the command to an appropriate data bank 110 along a path between the issuing host 102 and an appropriate data bank 110. In other cases, however, no such application or routing information may be present on host 102 and thus a WRITE command issued from a host 102 may be routed to any of data banks 110. It is the latter case that will be illustrated in this embodiment. After reviewing the description of this embodiment, however, it will be noted by those of skill in the art which steps are applicable to the former case as well.

At step 910, then, a WRITE command may be received at a receiving data bank 110. The distributed RAID application 210 on receiving data bank 110 may then determine at steps 920, 930 and 940 the segment of the volume corresponding to a logical address referenced by the WRITE command, the location of that segment (for example, which data banks 110 is storing the data corresponding to that segment) and the location of the parity corresponding to that segment (for example, which data bank 110 is storing the segment where parity data created from the data corresponding to that segment is stored). As discussed above, the location of both the data segment and the parity segment may be determined using global tables 240 stored on the receiving data bank 110.

If neither the data segment (the segment storing the data) nor the redundancy segment (in other words, where the parity or other type of redundancy data created from the data segment) is stored on the receiving data bank 110 (as determined at steps 950 and 960) the WRITE command may be communicated to the distributed RAID application 210 on the remote data bank 110 on which the data segment is stored at step 964 and to the distributed RAID application 210 on the remote parity data bank 110 on which the parity segment is stored at step 966. In one embodiment, this WRITE command may be communicated to the distributed RAID applications 210 at the remote data bank 110 and the remote parity data bank 110 using a command format utilized by distributed RAID applications 210.

This command, while providing pertinent information of the original WRITE command may also instruct a distributed RAID application 210 to perform other desired functionality.

Accordingly, after the WRITE command is sent to the remote data bank 110 and the remote parity data bank 110 completion notifications may be received from the distributed RAID applications 210 on the remote data bank 110 and the remote parity data bank 110 at steps 968 and 970. Once these acknowledgments are received the WRITE command may be responded to by the distributed RAID application 210 on the receiving data bank 110.

Returning to step 950, if, however, the data segment is stored at the receiving data bank 110, it may be determined if the WRITE command was received from a host 102 or another data bank 110 at step 952. If the WRITE command was received from a host 102 the WRITE command may be communicated to the distributed RAID application 210 on the remote parity data bank 110 at step 976 and placed in the write cache of the receiving data bank 110 at step 974. After receiving a completion notification from the distributed RAID applications 210 on the remote parity data bank 110 at step 978, the WRITE command may be responded to by the distributed RAID application 210 on the receiving data bank 110 at step 980 (for example, a response sent to the host 102). Furthermore, the WRITE command itself may be processed at step 982. This process may entail the storing of data associated with the WRITE command to the data segment stored on the receiving data bank 110 or other functionality.

On the other hand, if the WRITE command was not received from a host at step 952 this may indicate that the WRITE command was received from another data bank 110 (which, in many cases, may have been the data bank 110 which originally received the WRITE command from a host 102).

In this case, the data bank 110 may place the received WRITE command in its write cache at step 984 and sends a completion notification to the issuing data bank 110 at step 986. At some later point then, the WRITE command itself may be processed at step 988.

Returning again to step 950, if the data segment is not stored at the receiving data bank 110 but the parity segment is stored at the receiving data bank 110, as determined at step 960, it may be determined if the WRITE command was received from a host 102 or another data bank 110 at step 962. If the WRITE command was received from a host 102 the WRITE command may be communicated to the distributed RAID application 210 on the remote data bank 110 where the data segment corresponding to the WRITE is stored at step 1002 and placed in the write cache of the receiving data bank 110 at step 1000. After receiving a completion notification from the distributed RAID applications 210 on the remote data bank 110 at step 1004 the WRITE command may be responded to by the distributed RAID application 210 on the receiving data bank 110 at step 1006 and the write command processed at step 1008 by the receiving data bank 110.

Here, processing the write command may entail that the parity segment stored at the receiving data bank 110 may be updated based upon the write command. This update of the parity segment may be accomplished in a variety of ways, not all of which will be elaborated on herein but which will be known to those of ordinary skill in the art. For example, distributed RAID application 210 on parity data bank 110 may perform a backed out write in order to update the parity segment. Performing this backed out write may entail obtaining data segments from which the parity segment and performing logical operations (such as exclusive OR (XOR) operations) using the obtained data segments and the data to be written associated with the WRITE command. Alternatively, if distributed RAID application 210 on receiving data bank 110 has multiple WRITE commands corresponding to each of the data segments from which the parity segment was created, a new parity segment may be calculated and the original parity segment may be updated by replacing it with the newly calculated parity segment. Other methods for updating the parity segment may be realized from a review of the disclosures herein and the particular method utilized to update a parity segment by a distributed RAID application may depend on a variety of factors, including configuration parameters, the availability of certain data (for example, WRITE commands corresponding to all data segments used to create the parity, etc.) or any of a number of other factors.

Returning now to step 962, if the WRITE command was not received from a host this may indicate that the WRITE command was received from another data bank 110 (which, in many cases, may have been the data bank 110 which originally received the WRITE command from a host 102).

In this case, the WRITE command may be placed in the write cache of the receiving data bank 110 at step 990 and a completion notification sent to the issuing data bank at step 992. The WRITIE command may then be processed at step 994 (for example, the parity segment may be updated as discussed above).

After reviewing the above discussion it will be noted that in many cases, a distributed RAID application 210 at a particular data bank 110 may not be able to process a received WRITE command until notification is received from a parity data bank 110, that a parity data bank may need to evaluate multiple received WRITE commands to determine or implement a method for updating the parity or any of a number of other instances when it may be desired to store one or more WRITE commands or evaluate a set of these stored WRITE commands. To facilitate the storage and evaluation of WRITE (or other) commands, each distributed RAID application 210 may have an associated write cache 260.

Figure 10:
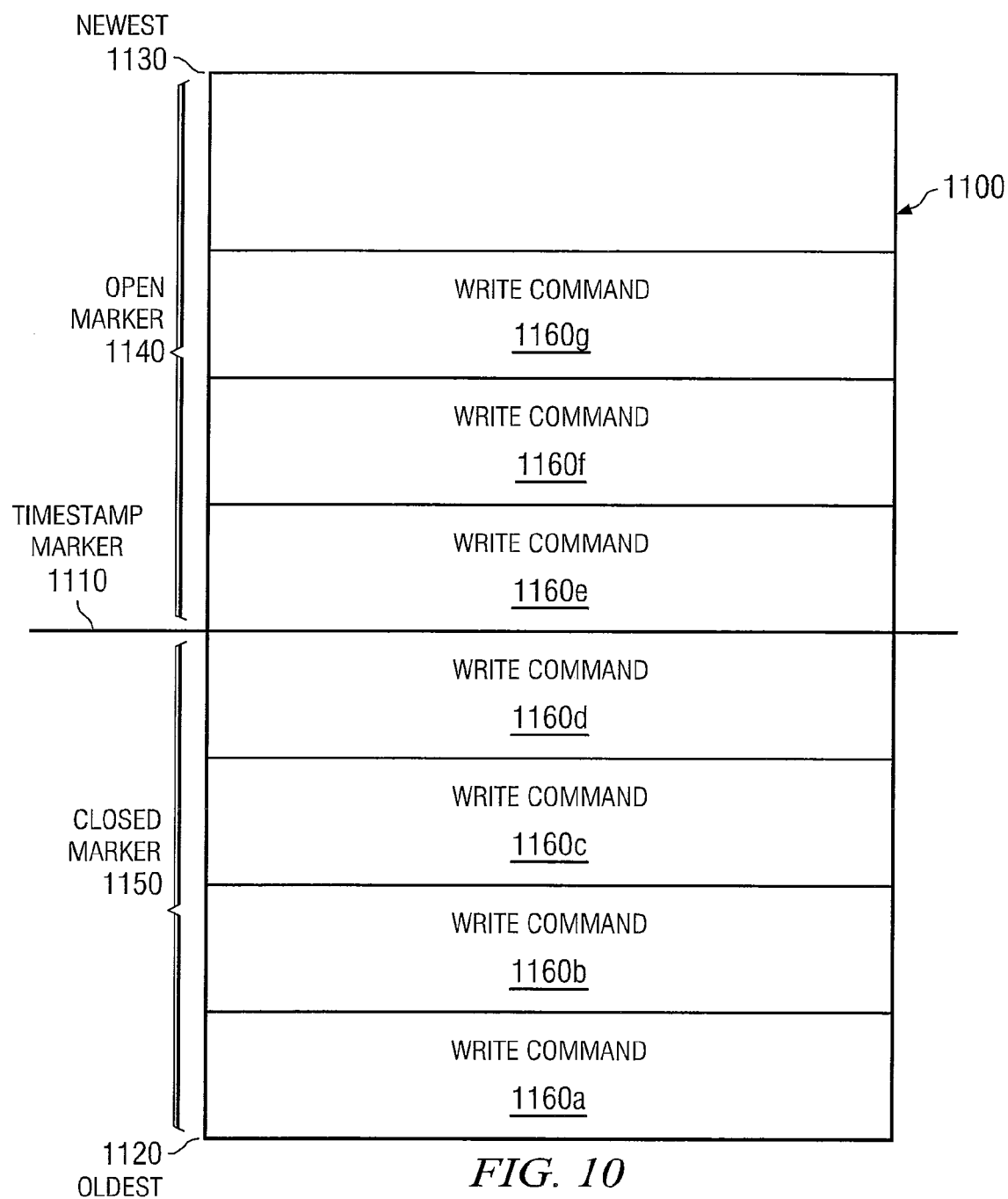
FIG. 10 is a block diagram of one embodiment of a write cache.

A representation of one embodiment of a write cache is depicted in FIG. 10. As WRITE commands are received by distributed RAID application 210 they are placed in write cache 1100. Each of these WRITE commands 1160 may have an associated timestamp indicating when the WRITE command 1160 was received. Thus, in one embodiment write cache 1100 may comprise a queue of time stamped WRITE commands 1160. At some point a timestamp marker may be issued by distributed RAID application 210. This timestamp marker may comprise a time and be communicated to each of distributed RAID applications 210. When to issue a timestamp market may be determined in a variety of ways, such as when the write cache 1100 is a certain percentage full or when a certain number of WRITE commands 1160 have been received, at a certain time interval or a variety of other methodologies.

In any event, this timestamp marker 1110 will segment each of the write caches 1110 associated with each of the distributed RAID applications 210 into at least two segments a closed marker 1150 comprising WRITE commands 1160 received before the timestamp marker 1110 (in this example WRITE commands 1160a, 1160b, 1160c and 1160d) and an open marker 1140 comprising WRITE commands 1160 received after the timestamp marker 1110 (in this example WRITE commands 1160e, 1160f and 1160g). Distributed RAID application 210 may then evaluate the set of WRITE commands 1160 in the closed marker 1150 (in this example WRITE commands 1160a, 1160b, 1160c and 1160d) to determine how these WRITE commands 1160 are to be processed while received WRITE commands may still be added to open marker 1140.

Conversely, as the closed marker 1150 comprises a set of WRITE commands which are no longer changing distributed RAID application may evaluate this set of WRITE commands 1160 with respect to one another (or other criteria) to determine an order of execution (and may therefore reorder WRITE commands 1160 in closed marker 1160), a methodology to update a parity segment (for example, if there are WRITE commands in closed marker 1150 which correspond to each data segment used to create a parity) or make other determinations associated with the processing of WRITE commands 1160. It will be noted that as a timestamp marker 1110 may be issued for multiple reasons by any of distributed RAID applications 210 on each of data banks 110, multiple closed markers may exist at any one point, for example, when multiple timestamp markers 1110 are issued by distributed RAID applications 210 between the time the write cache is evaluated by any one of the distributed RAID applications 210.

After reviewing the above the reader may now have an understanding of how distributed RAID applications 210 on data banks 110 operate in tandem to achieve virtualized storage and RAID implementation. It may be further helpful to an understanding to certain embodiments, however, to discuss the functioning of certain embodiments of distributed RAID application 210 after the occurrence of a fault. As discussed above, distributed RAID application 210 may be aware (for example, have stored) of a data bank which is faulty (in other words, which may have a hardware, software, communication or other fault which impedes or hampers the ability of the data bank 110 to operate or access data). Distributed RAID application 210 may be able to account for such faults while satisfying commands from hosts 102.

Figure 11:
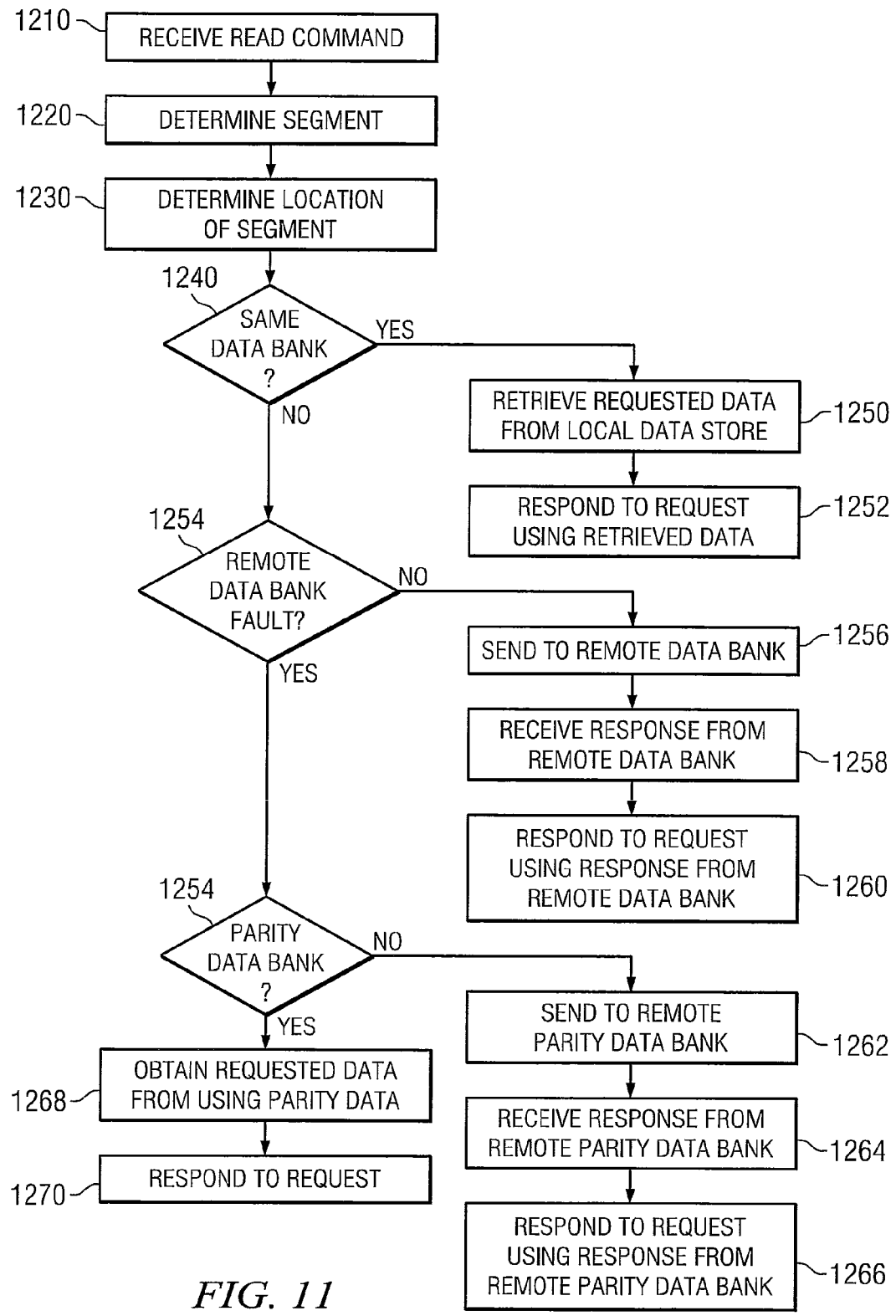
FIG. 11 is a flow diagram of one embodiment of a method implemented by a distributed RAID system.

To illustrate, FIG. 11 depicts a flow diagram for one embodiment of a method for implementing a READ command in a distributed RAID system. It will be understood that this method applies to an embodiment where RAID 5 has been implemented in conjunction with a range of a volume and that other embodiments may be equally well applied in cases where other levels (or no level) of RAID have been implemented. The READ command may be sent by a host 102 to a data bank 110 through a switch 120 or from another data bank 110 to the receiving data bank 110. At step 1110, then, a READ command may be received at a data bank 110. The distributed RAID application 210 on data bank 110 may determine, at step 1220, a data segment which corresponds to a logical address referenced in the received READ command and on which data bank 110 the data segment is stored at step 1230. If the data bank 110 which is storing the data segment is the same as the data bank 110 which received the READ command (as determined at step 1240) the requested data can be obtained from the appropriate disk 252 of the data store 250 on the receiving data bank 110 at step 1250 and the received READ command responded to using the obtained data at step 1252. If the receiving data bank 110 received the READ command from the host 102 the host 102 may be responded to while if the receiving data bank 110 received the READ command from another data bank 110 the response may be sent to the distributed RAID application 210 on the data bank 110 which issued the READ command.

If, however, the data segment is stored on a remote data bank 110 (a data bank 110 other than the one which received the command) at step 1254 it may be determined if the remote data bank 110 on which the data segment to be read is stored has experienced a fault. If not the READ command may be sent to the distributed RAID application at the remote data bank 110. After a response comprising the requested data is received from the remote data bank 110 at step 1258 the received READ command may be responded to using that data at step 1260.

If the remote data bank 110 has experienced a fault, however, it may be determined at step 1254 if the receiving data bank 110 holds the parity segment corresponding to the data segment associated with the READ command. If the parity segment is stored at the receiving data bank 110 the data segment corresponding to the READ command may be obtained using the parity segment stored at the receiving data bank 110. Obtaining the data segment from the parity data may be accomplished in a variety of way which will not be elaborated on in more detail, including obtaining the other data segments (data segments other than the one corresponding to the READ command) from other data banks 110 and obtaining the desired data segment by performing logical operations between the other data segment and the parity segments.

Once the requested data segment has been obtained using the parity data at step 1268 the received READ command may be responded to at step 1270. If the receiving data bank 110 received the READ command from the host 102 the host 102 may be responded to while if the receiving data bank 110 received the READ command from another data bank 110 the response may be sent to the distributed RAID application 210 on the data bank 110 which issued the READ command.

If the receiving data bank 110 is not the data bank 110 storing the parity block a READ command may be sent to the remote data bank 110 on which the parity segment corresponding to the data segment referenced in the READ command is stored at step 1262. After a response comprising the requested data is received from the remote parity data bank 110 at step 1264 the received READ command may be responded to using that data at step 1266.

Figure 12:
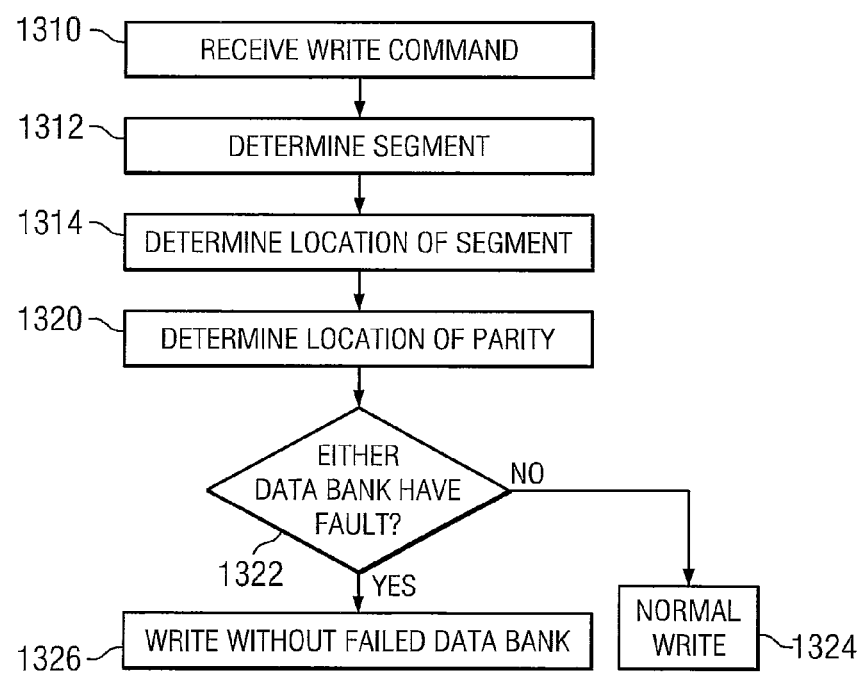
FIG. 12 is a flow diagram of one embodiment of a method implemented by a distributed RAID system.

Moving on to FIG. 12, a flow diagram for one embodiment of a method for implementing a WRITE command in a distributed RAID system is depicted. This WRITE command may be sent by a host 102 to a data bank 110 through a switch 120 or from one data bank 110 to another data bank 110. At step 1310, then, a WRITE command may be received at a receiving data bank 110. The distributed RAID application 210 on receiving data bank 110 may then determine at steps 1312, 1314 and 1320 the data segment corresponding to a logical address referenced by the WRITE command, the location of that data segment (for example, which data banks 110 is storing the data corresponding to that segment) and the location of the parity segment corresponding to that data segment (for example, which data bank 110 is stores the segment where parity data created from the data corresponding to that segment is stored). As discussed above, the location of both the data segment and the parity segment may be determined using the set of tables 240 stored on the receiving data bank 110.

It can then be determined if either the data bank 110 on which the data segment is stored or the data bank 110 on which the parity segment is stored have experienced a fault. If neither of those data banks 110 has experience a fault a normal write operation may be carried out at step 1324 by the distributed RAID application. A normal write operation has been discussed previously with respect to FIGS. 9A and 9B and will not be discussed further.

If however, either of those data banks 110 has experienced a fault a write operation taking into consideration the failed data bank 110 may be conducted at step 1326. This write operation may parallel substantially identically the write operation described with respect to FIGS. 9A and 9B with the exception that before a write command is sent to a data bank 110 it is determined if the data bank 110 to which the write is to be sent is failed and if so that write command is not sent to the failed data bank 110. In all other respects the write operation is substantially identical.

After reviewing the aforementioned flow diagrams the operation of certain embodiments may be better understood with reference to specific examples of one embodiment of a distributed RAID system in operation. To that end, attention is directed back to FIG. 4 which illustrates one embodiment of a distributed RAID system with five data banks 110. To begin with a first example, suppose that host 102b issues a READ command to data bank 110c, where the READ command references a logical address which corresponds to data segment "2" 402c on data bank 110a. Here, distributed RAID application 210c on data bank 110c may determine that the logical address of the received READ command references data segment "2" 402c and that data segment "2" 402c is stored on data bank 110a. Distributed RAID application 210c may then send a corresponding READ command to data bank 110a.

Distributed RAID application 210a on data bank 110a may receive this READ command, determine that the READ command references a logical address which corresponds to data segment "2" 402c and that data segment "2" 402c is located on the data bank 110a on which it is executing. Distributed RAID application 210a may then access data store 250a to obtain the data requested from data segment "2" 402c and return this obtained data to the distributed RAID application 210c at issuing data bank 110c. Distributed RAID application 210c on data bank 110c may receive this response from distributed RAID application 210a on data bank 110a and use data from this response to respond to the original READ command issued from host 102b.

Now suppose that host 102b issues a READ command to data bank 110c, where the READ command references a logical address which corresponds to data segment "2" 402c on data bank 110a, but that data bank 110a has experience a fault and is no longer operating. In this case, distributed RAID application 210c on data bank 110c may determine that the logical address of the received READ command references data segment "2" 402c and that data segment "2" 402c is stored on data bank 110a. Additionally, distributed RAID application 210c on data bank 110c may also determine that data bank 110a has experienced a fault.

Accordingly, distributed RAID application 210c may determine that the location of parity segment 402j corresponding to data segment "2" 402c is data bank 110e. Distributed RAID application 210c may then send a READ command to data bank 110e. Distributed RAID application 210e on data bank 110e may receive this READ command, determine that the READ command references a logical address which corresponds to data segment "2" 402c and that the parity segment 402j corresponding to data segment "2" 402c is located on the data bank 110e on which it is executing. Distributed RAID application 210e may then access data store 250e to access parity segment 402j and obtain the data requested from data segment "2" 402c using the parity segment 402j. This obtained data may be returned to the distributed RAID application 210c at issuing data bank 110c. It will be noted that distributed RAID application 210e may need other data to determine the data requested for data segment "2" 402c. Accordingly, distributed RAID application 210e may determine that the location of data segment "0" 402a, data segment "1" 402b and data segment "3" 402d which were used in conjunction with data segment "2" 402c to create parity segment 402j are located respectively on data banks 110b, 110d and 110c. Distributed RAID application 210e may thus obtain data segment "0" 402a, data segment "1" 402b and data segment "3" 402d by sending READ requests to these data banks 110b, 110d and 110c and use data segment "0" 402a, data segment "1" 402b and data segment "3" 402d in conjunction with parity segment 402j to obtain the data requested from data segment "2" 402c.

Distributed RAID application 210c on data bank 110c may receive the response from distributed RAID application 210e on data bank 110e and use data from this response to respond to the original READ command issued from host 102b. In this manner, data corresponding to a data segment can still be read by a host despite the occurrence of a fault in the distributed RAID system.

Continuing on with WRITE commands, suppose that host 102b issues a WRITE command to data bank 110c, where the WRITE command references a logical address which corresponds to data segment "2" 402c on data bank 110a. Here, distributed RAID application 210c on data bank 110c may determine that the logical address of the received WRITE command references data segment "2" 402c and that data segment "2" 402c is stored on data bank 110a. Furthermore, distributed RAID application 210c may determine that the parity segment 402j corresponding to data segment "2" 402c is located on data bank 110e. Distributed RAID application 210c may then send a corresponding WRITE command to data banks 110a and 110e. Upon receiving completion notifications from distributed RAID applications 210a and 210e, distributed RAID application 210c may respond to the originally received WRITE command.

Distributed RAID application 210e on data bank 110e may receive its corresponding WRITE command, determine that the WRITE command references a logical address which corresponds to data segment "2" 402c and that the parity segment 402j corresponding to data segment "2" 402c is located on the data bank 110e on which it is executing. Distributed RAID application 210e may place the WRITE command in its write cache and send a completion notification to data bank 110c. Distributed RAID application 210e may then access data store 250e to access parity segment 402j and update the parity segment 402j using the data referenced in the received WRITE command.

Distributed RAID application 210a on data bank 110a may receive its corresponding WRITE command, determine that the WRITE command references a logical address which corresponds to data segment "2" 402c and that data segment "2" 402c is located on the data bank 110a on which it is executing. Distributed RAID application 210a may place the WRITE command in its write cache and send a completion notification to data bank 110c. Distributed RAID application 210a may then access data store 250a to update the segment "2" 402c using the data referenced in the received WRITE command.

Again suppose now that host 102b issues a WRITE command to data bank 110c, where the WRITE command references a logical address which corresponds to data segment "2" 402c on data bank 110a, but that data bank 110a has experience a fault and is no longer operating. In this case, distributed RAID application 210c on data bank 110c may determine that the logical address of the received WRITE command references data segment "2" 402c and that data segment "2" 402c is stored on data bank 110a. Additionally, distributed RAID application 210c on data bank 110c may also determine that data bank 110a has experienced a fault. Furthermore, distributed RAID application 210c may determine that the parity segment 402j corresponding to data segment "2" 402c is located on data bank 110e. Distributed RAID application 210c may then send a corresponding WRITE command to data bank 110e. Upon receiving a completion notification from distributed RAID applications 210e distributed RAID application 210c may respond to the originally received WRITE command.

Distributed RAID application 210e on data bank 110e may receive the corresponding WRITE command, determine that the WRITE command references a logical address which corresponds to data segment "2" 402c and that the parity segment 402j corresponding to data segment "2" 402c is located on the data bank 110e on which it is executing. Distributed RAID application 210e may place the WRITE command in its write cache and send a completion notification to data bank 110c. Distributed RAID application 210e may then access data store 250e to access parity segment 402j and update the parity segment 402j using the data referenced in the received WRITE command. In this manner, data corresponding to a data segment can still be written by a host despite the occurrence of a fault in the distributed RAID system.

After reviewing the above embodiments of distributed RAID systems it may be observed that during the operation of such distributed RAID systems a number of eventualities may occur. The eventualities may for example, entail alterations to such a distributed RAID system, such as, for example, the addition of new storage within a data bank, the failure or removal of storage within a data bank, the addition or removal of data banks, the alteration of a RAID level or RAID type of a volume, etc. Alterations of these types, or any of a number of other causes, may entail the movement of data comprising a volume, movement of redundancy data corresponding to a volume, the creation and placement of redundancy data corresponding to a volume, that data comprising a volume or corresponding redundancy data be created or moved among the plurality of data banks or within a single data bank, etc. (collectively referred to herein as migration). It is therefore desired to handle such migration as seamlessly as possible, such that a user's access to data of the volume may be minimally affected.

Figure 13:
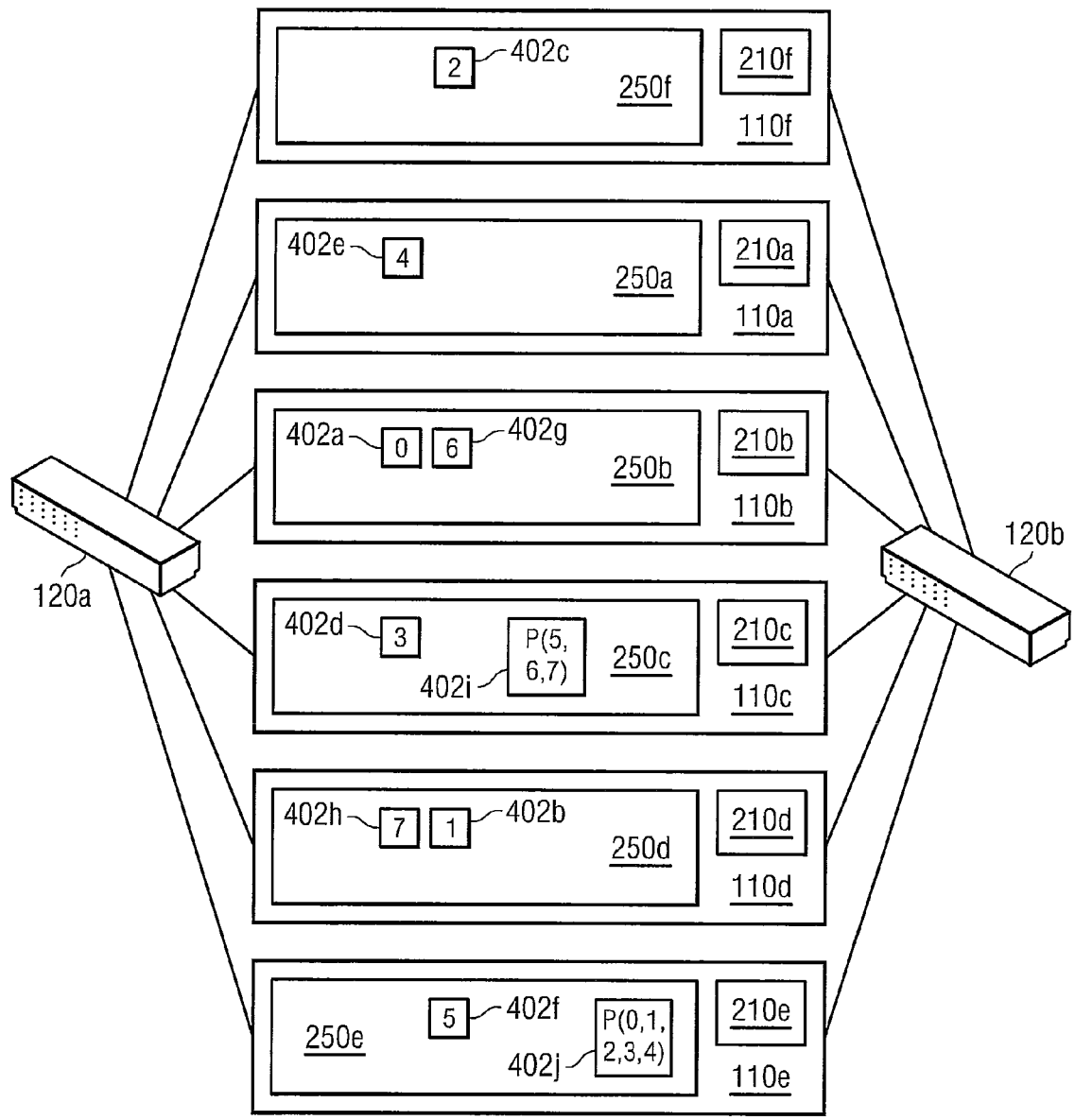
FIG. 13 is block diagram of an example of one embodiment of an architecture employing a distributed RAID system.

It may be helpful here, before delving into more detail about the migration process, to describe certain instances in which embodiments of such a migration processes may be effectively utilized. FIG. 13 depicts an embodiment of such a scenario where a data bank 110 has been added to the embodiment of the distributed RAID system of FIG. 4. In FIG. 4, a volume is stored on a distributed RAID system with five data banks 110. The volume comprises a set of equally sized segments 402a-402f where the random permutation of the data banks 110 used to store data segments of the volume is: data bank 110b, data bank 110d, data bank 110a, data bank 110c, and data bank 110e. Furthermore corresponding parity segments 402i and 402j stored on databank 110c and data bank 110e are utilized to implement RAID level 5 with a (4+1) parity set in conjunction with the volume.

Now, with reference to FIG. 13, suppose data bank 110f is added to the distributed RAID system depicted in FIG. 4. When data bank 110f is added, the amount of storage in data store 250f may be likewise added to the storage available for use by the distributed RAID system. In order to effectively integrate data bank 110f (and the storage provided by data store 250f) into the distributed RAID system it may be desired to migrate at least some data which previously was stored on data banks 110a-110e to data store 250f of newly added data bank 110f. However, as an additional data bank 110f is now available to store data it may be desired as well to utilize a different parity set in conjunction with one or more volumes of data stored on the distributed RAID system.

Thus, when a new data bank 110f is added, data associated with one or more volumes previously stored on data banks 110a-110e may be migrated such that data associated with these volumes may be stored on a number of data banks 110 which may include data bank 110f. This migration process may encompass moving the data segments of the volume from one data bank 110 to another, the calculation of new redundancy segments corresponding to the volume (for example to implement a new RAID level or RAID size), or other movement or calculation of data.

In FIG. 13, one example of a migration of the volume described with respect to FIG. 4 which may occur with the addition of data bank 110f is depicted. Here, when it is desired to move the volume a distributed RAID application 210 may determine a new configuration for the volume, including a new random permutation (of data banks 110) for the volume, as a new data bank 110f has been added. For purposes of this example, assume that the new random permutation for the volume is: data bank 110b, data bank 110d, data bank 110f, data bank 110c, data bank 110a and data bank 110e. Furthermore, in this example, as RAID 5 is desired with respect to the volume, in determining a new configuration for the volume the distributed RAID application 210 may determine that as six data banks 110 are now being utilized a RAID size of a (5+1) parity set may be desired. Distributed RAID application 210 may then determine that to store the parity to implement RAID 5 in conjunction with eight segments 402 an additional two segments 402 may be needed.

Thus, data bank 110b may be assigned segment 402a the first segment of the requested volume, data bank 110d may be assigned segment 402b the second segment of the requested volume, data bank 110f may be assigned segment 402c the third segment of the requested volume, data bank 110c may be assigned segment 402d the fourth segment of the requested volume, data bank 110a may be assigned segment 402e the fifth segment of the requested volume and data bank 110e may be assigned segment 402f the sixth segment of the requested volume. The assignment then begins again with the first data bank 110 of the random permutation such that data bank 110b may be assigned segment 402g the seventh segment of the volume and data bank 110d may be assigned segment 402h the eighth segment of the volume. The data segments 402 can then be moved (from the location depicted in FIG. 4) to their newly determined locations (depicted in FIG. 13) if movement is necessary.

Once the data segments 402a-402h for storing data associated with the volume have been assigned, distributed RAID application 210b may assign segments 402 for any data associated with the implementation of that RAID level. As it is desired that the parity created utilizing a particular set of data segments 402 will not be stored on a data bank 110 having any of those set of data segments 402 currently in its data store 250. Thus, distributed RAID application 210 may also determine a location where each of the parity segments will be allocated based on the determined RAID size, the location of the first data segment 402a, etc. Here, parity segment 402j which will store the parity data corresponding to the data stored in data segments 402a, 402b, 402c, 402d and 402e will be allocated in data store 250e of data bank 110e while parity segment 402i which will store the parity data corresponding to the data stored in data segments 402f, 402g and 402h will be allocated in data store 250c of data bank 110c.

After the assignment of the location of the data segments and redundancy segments for the new configuration of the volume, distributed RAID application 210 may facilitate the migration of the volume by moving the data segments from their previous location according to the old configuration to the new location assigned according to the newly determined configuration if needed. Here, for example, segment "0" 402a may be in data store 250b of data bank 110b in the old configuration (as depicted in FIG. 4) and may be assigned to data bank 110b in the new configuration (represented by FIG. 13), thus it may not be necessary to move segment 402a. Segment "2" 402c, however, may be assigned to, and stored in the data store 250a of, data bank 110a in the old configuration while in the new configuration of the volume segment "2" 402b is assigned to data bank 110f, thus it segment "2" 402b may be stored in data store 250f of data bank 110f. In general then, if a segment resides on a data bank 110 in the old configuration and is assigned to the same data bank 110 in the new configuration no movement may be necessary, while of the data bank on which the segment resides is different from the data bank to which it is assigned in the new configuration movement of the segment may occur during the migration process.

The migration process may also entail the creation or movement of redundancy segments, if needed. Here, in the old configuration of the volume (represented by FIG. 4) the volume was configured according to RAID size of a (4+1) parity set, thus, segment 402i stored on data bank 110c and segment 402j stored on data bank 110e are created from four data segments according to the old configuration. However, in the new configuration it is desired to utilize a (5+1) parity set. Thus, distributed RAID application 210 may, during the migration process, calculate data for the parity segment 402j from data segment "0", data segment "1", data segment "2", data segment "3" and data segment "4" and store this calculated in the parity segment 402*j*. Similarly, distributed RAID application 210 may calculate data for the parity segment 402*i* from data segment "5", data segment "6" and data segment "7" and store this calculated in the parity segment 402*i*. Note here that, in this particular example, the parity segments for the new configuration have been assigned to the same data banks 110 as in the old configuration. However, this may not be the case in other situations, and in such cases, if needed the newly calculated parity data may be stored on a different data bank to which the corresponding parity segments is assigned.

Notice then, with respect to this example, that a volume previously stored in an old configuration and existing on a distributed RAID system having five data banks 110 has been migrated in conjunction with the addition of a new data bank 110 to the distributed RAID system such that the volume is now stored in a new configuration across the data banks 110 of the newly configured distributed RAID system, including the newly added data bank 110*f*. Additionally notice that the parity set used in conjunction with the implementation of RAID with respect to the volume in the different configurations has also changed based on the addition of data bank 110*f* to the distributed RAID system.

Figure 14:
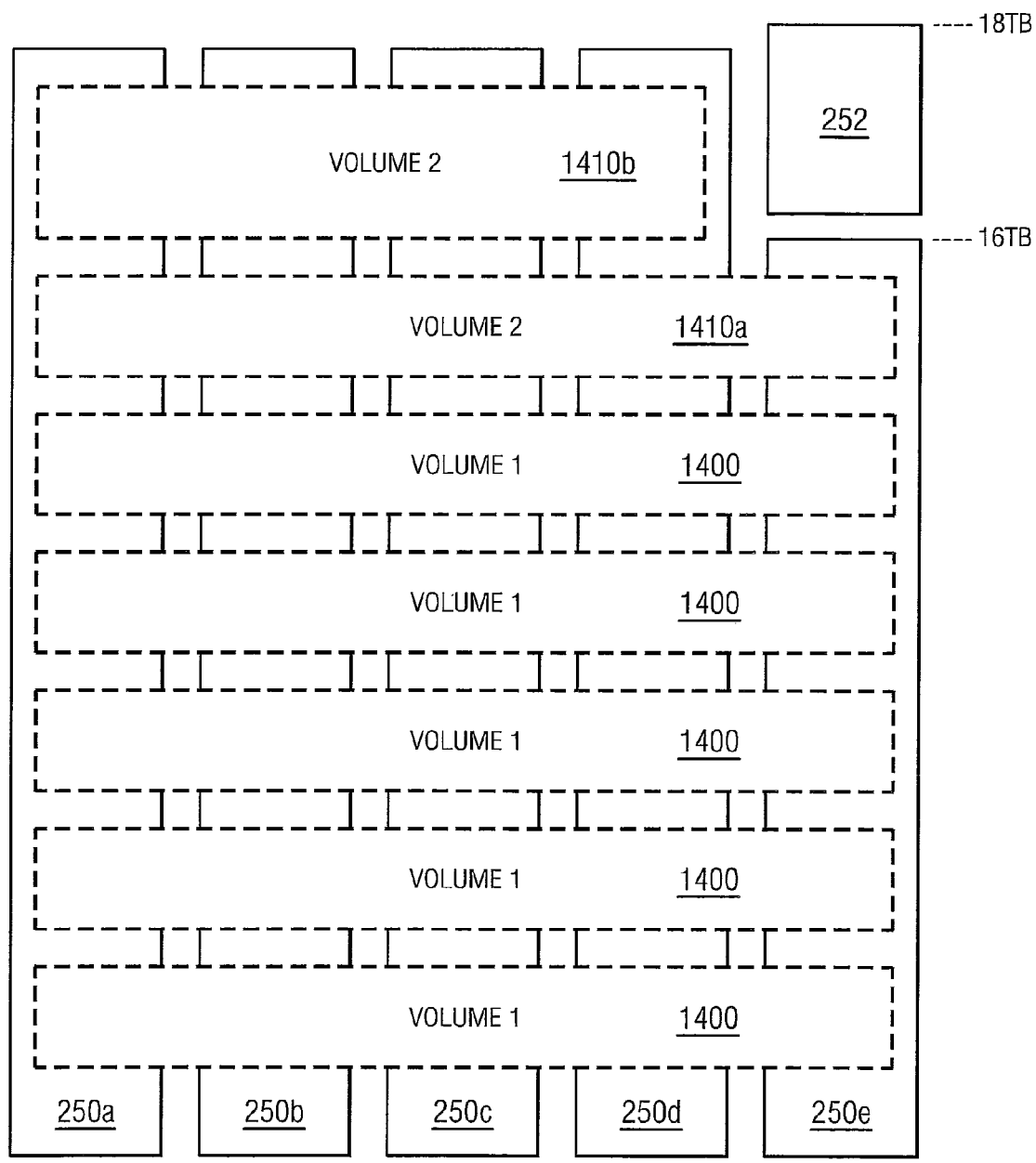
FIG. 14 is block diagram of an example of one embodiment of an data stores in a distributed RAID system.

Another scenario in which the migration of data in conjunction with a distributed RAID system may be desired is depicted with FIG. 14. As described above, each data bank 110 has a data store 250 comprising a set of disks 252. As each data store 250 may comprise a different number of disks 252 and each disk 252 may have different capacity each data store 250 of each data bank 110 may be of a different size. This variability may lead to situations in which volumes stored in a distributed RAID system may be stored across the data stores 250 of fewer data banks 110 (for example, than other volumes or than the aggregate number of data banks 110 in the distributed RAID system) or which may have different parity or redundancy sets (assuming, for example, the case that they have both implemented in conjunction with the same RAID level). Furthermore, these conditions may exist with respect to the same volume. In other words, portions of the same volume may be stored less than all the data banks 110 or portions of the same volume may have different parity or redundancy sets.

Accordingly, when disks 252 are added to one or more data stores 250 of data banks 110 it may be desired to migrate data associated with one or more volumes such that data associated with these volumes may be stored on the newly added disk 252. By migrating such a volume, a bigger portion of the volume may be stored across more of the data banks 110 or different parity or redundancy set may be implemented in conjunction with the volume, which may, in turn, increase the efficiency of operation of the distributed RAID system, increase the security of data, decrease access times, or achieve a whole host of other advantages.

With reference to FIG. 14, suppose that data stores 250*a*, 250*b*, 250*c*, 250*d* comprise 18 terabytes of storage while data store 250*e* comprises 16 terabytes of storage. Here, volume "1" 1400 may be stored on each of data stores 250*a*, 250*b*, 250*c*, 250*d* and 250*e*. Now suppose that volume "2" 1410 is created in the distributed RAID system and that it is determined that volume "2" 1410 will be implemented in conjunction with RAID level 5 and a (4+1) RAID parity set. After storing portion 1410*a* of volume "2" however, it is determined that all the storage of data store 250*e* on data bank 110*e* has been utilized. In this case, the second portion of volume "2" 1410*b* may be stored only on data stores 250*a*, 250*b*, 250*c* and 250*d* and may be implemented in conjunction with a (3+1) RAID parity set. Thus, a first portion 1410*a* of volume "2" is stored on all data banks 110 and has one type of parity set (4+1) while another portion 1410*b* of volume "2" is stored on fewer data banks 110 and is implemented with a different parity set (3+1). At this point, a disk 252 may be added to data store 250*e* increasing the size of data store 250*e* to 18 terabytes. Here it may be desired to migrate portion 1410*b* of volume "2" such that both portions 1410*a* and 1410*b* of volume "2" may be stored on the data stores 250 of all data banks 110 and that both portions 1410*a*, 1410*b* may be implemented in conjunction with the same size parity set (4+1).

It will be apparent from the above discussion that there may be a variety of situations where it is desired to migrate data associated with a volume, including the addition or removal of data banks 110, the addition or removal of storage from one or more data stores 250 on a data bank 110, a change in the level of RAID implemented in conjunction with a volume, a failure of one or more disks 252 of a data store 250 or of one or more data banks 110, some combination of the above, or for some other reason entirely.

Figure 15:
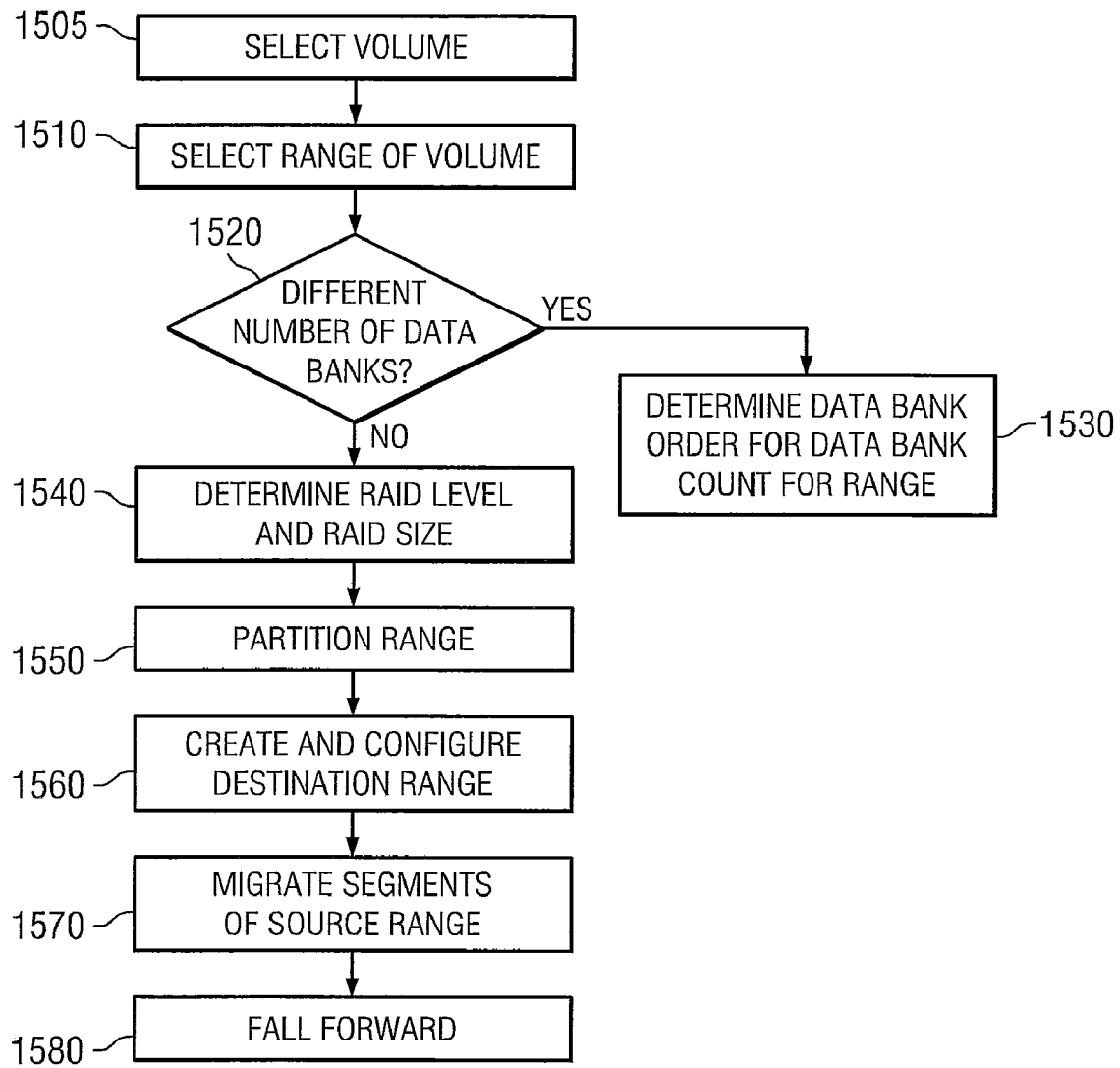
FIG. 15 is a flow diagram of one embodiment of a method for migration implemented by a distributed RAID system.

Moving to FIG. 15, one embodiment of a method for migrating data in a distributed RAID system is depicted. In response to a trigger, as discussed above, one or more volumes may be selected as source volumes at step 1505. A volume may be selected based on a variety of criteria, for example, if a volume comprises one or more portions which are stored on different numbers of data banks 110 or which have different parity sets, that volume may be selected when storage is added. Volumes may be selected as source volumes based on size, on age, on the number of data banks 110 on which they are stored (for example, volumes stored on the fewest number of data banks 110 may be selected first), on RAID level, or on almost any other criteria desirable.

For a selected source volume, then, at step 1510 a range of the source volume is selected. As discussed above with respect to FIG. 5, each volume may have one or more ranges, where each range corresponds to a number of segments of the volume. Once again, then, a variety of criteria may be utilized to select a range of a source volume. These criteria include the number of segments in a range, the RAID level or parity size associated with the range, the data bank count associated with the range (number of data banks 110 on which that range is stored), or almost any other criteria desirable.

Once a particular range of a source volume is selected it can then be determined if there are currently a different number of data banks 110 at step 1520. This determination may be made based upon a comparison of the number of data banks 110 before the migration process was initiated and the number of data banks 110 currently installed in the distributed RAID system, or may be made, for example, based upon a comparison of the databank count 554 associated with the range and the number of data banks 110 which have room in data store 250 to store the destination volume (the source volume after it has been migrated to its new configuration) or based upon some other comparison involving the number or ability (for example, free storage) of data banks 110 to store data associated with the corresponding range of the destination volume.

As should be noted, the determination of a different number of data banks 110 may pertain to the number of data banks 110 available to store data associated with destination volume or range and may not indicate that a new data bank 110 itself has been added to the distributed RAID system. For example, if storage has been added to a data bank 110 already installed in distributed RAID system 110 it may determined that a different number of data banks 110 are available to store data associated with the corresponding range of the destination volume, even if another data bank 110 has not been added to the distributed RAID system (see, for example, FIG. 14 and the accompanying description).

If a different number of data banks 110 is available to store data associated with the corresponding range of the destination volume, at step 1530 a new databank order may be determined for the databank count (which may be, for example, the number of data banks 110 available to store data associated with the corresponding range of the destination volume). In one embodiment, to determine a new databank order a new random permutation of the set of data banks 110 available to store data of the destination volume may be determined. Thus, for example, if a distributed RAID system comprises six data banks and if all six data banks are available to store the corresponding range of the destination volume a random permutation of size six, where the random permutation comprises each of the data banks 110, may be determined such that the segments of the corresponding range of the destination volume may assigned to each of the six data banks consecutively in the order of the random permutation. However, if only five of the six data banks 110 are available a random permutation of size five, where the random permutation comprises each of the five available data banks 110 may be determined such that the segments of the corresponding range of the destination volume may assigned to these five data banks consecutively in the order of the random permutation.

After the new databank order for the databank count are established at step 1530 or if a different number of data banks is not being utilized, a level of RAID to be implemented in conjunction with the corresponding range of the destination volume and an associated RAID size (for example, a size of a parity set, etc.) may be determined at step 1540. As mentioned above the user may specify that a level of RAID is to be implemented in conjunction with a destination volume. If the user has not changed the specification of the level of RAID, the new level of RAID associated with the corresponding range of the destination volume may be the same as the previous level of RAID associated with the range of the source volume.

However, a new level of RAID may also be specified by the user in conjunction with the migration of data of the volume, or it may be the case that only a certain level of RAID can be implemented because of certain restraints associated with the distributed RAID system (for example, the number of available data banks 110 on which to store data of the destination volume may dictate that a particular level of RAID be utilized, even if this level of RAID is different than the level of RAID previously implemented in conjunction with the range of the source volume). Similarly, the RAID size may be determined based on the RAID level specified or the number of data banks 110 (for example, databank count) which will be used to store data associated with the range or destination volume.

Once the databank order, databank count, RAID level and RAID size for the new configuration of the range of the volume have been determined (one or more of which may be the same as the existing range of the volume), the range of the source volume may be partitioned at step 1550. As discussed above, in one embodiment a table may be used to describe a volume, and a range entry in that table may be used to describe a range of a volume. Thus, in one embodiment, to partition a range, the range entry of the table corresponding to the source volume comprising the range is split into two range entries based upon a migration segment size. Additionally, the table describing the volume may be updated to reflect the split of the original range entry into two range entries (for example, by updating the Range Count entry of the table).

More specifically, in one embodiment a new range entry corresponding to a number of segments of the original range equal to the migration segment size may be created, where the new range entry describes a range comprising a number of segments of the original range (where the number of segments is equal to the migration segment size). The original range entry can be modified such that it no longer describes the segments now described by the new range entry. In this way two range entries are created from the original range entry where the two range entries describe all the segments of the original range entry: specifically a new range entry which describes a range corresponding to a number of segments (equal to the migration segment size) of the original range entry and a modified original range entry which describes all the segments of the original range entry except those described by the new range entry.

It will be noted that except for the designation of which segments correspond to the entry and the type designation of the range entries, the configuration (for example, Databank Count, Databank Order, RAID level, RAID size, etc.) described by the modified original range entry and the newly created range entry are substantially similar at this point. The newly created range entry (describing the number of segments of the migration segment size) may then be marked as a source for purposes of the data migration. The marking of this range entry may entail, for example, changing a Type indicator of the range entry to "SRC" or otherwise to indicate that it is a source range.

The migration segment size may be chosen based on a variety of variables, including, in one embodiment, the space reserved to perform data migration in one or more of data stores 250. In particular, in one embodiment, a portion of each data store 250 on each data bank 110 may have space reserved to perform such data migration. The amount of space may, for example, be a percentage of the total size of data store 250, may be a fixed amount or may be equal to some other size entirely. In one embodiment, the amount of reserved space of each data store is equally to approximately 1000 times the segment size.

Thus, the migration segment size may be approximately equal to the amount of reserved space on a data store. So, for example, in one embodiment 1000 segments of a range may be selected when partitioning a range at step 1550. These segments may, for example be selected utilizing the addresses of the segments comprising the range such that the number of segments starting with the lowest or highest address may be selected from the segments comprising the original range.

It may be helpful here to give a numerical example, suppose an original range comprises 10,000 segments, with the first segment of the range having an address of 500, the last segment having an address of 10,499 where the migration segment size is 1000. Here, when the original range is partitioned a new range entry describing the segments having the addresses 500-1,499 may created while the original range entry is modified to describe the segments of the original range having the addresses 1,500-10,499. As can be seen then, these two range entries describe all the segments of the original range entry (here, addresses 500-10,499). The new range entry (describing addresses 500-1,499) may then be marked as a source range as described above.

Once the original range has been partitioned to create a source range entry, at step 1560 a destination range entry may be created and configured. To create a destination range entry the source range entry may be duplicated and the duplicated range entry marked as a destination range entry by, for example, changing a Type indicator of the duplicated range entry to "DST" or otherwise to indicate that it is a destination range. Thus, there now exist two range entries for the new range entry created from the original range entry (discussed above): the source range entry which is a part of the table describing the volume being migrated and the destination range entry.

The destination range entry may then be configured by assigning the destination range entry the values corresponding to the new configuration, including the databank count, databank order, RAID level and RAID size which were determined above for the corresponding range of the migrated volume. At this point then, the source range entry describes the currently implemented configuration for example, the databank count, databank order, RAID level, RAID size, etc.) associated with a set of segments (equal in number to the migration segment size) of the original range, while the destination range entry describes the new configuration associated with the same set of segments as it is to be implemented in the migrated volume.

Using the source range entry and the destination range entry, the set of segments may then be migrated from the configuration described by the source range entry to the configuration described by the destination range entry at step 1570. This migration process may ensure that the set of segments are stored according to the databank order of the destination range entry and that any data corresponding to the implementation of RAID in conjunction with the destination range (in other words according to the RAID level and RAID size of the destination range entry) is created and stored at an appropriate location such that the RAID information is appropriately distributed across data banks 110 to ensure that the desired level of RAID is achieved with respect to the set of segments. It will be noted that in some cases the migration process will entail the copying of segments between data banks 110, the movement of RAID data between data banks 110, the creation and storing of new RAID data from the set of segments being migrated, etc. and that the segments moved, RAID data created, stored or moved, will depend on both the configuration of the source range and the desired configuration of the destination range.

Accordingly, during this migration process there will be an original set of data segments and corresponding redundancy segments configured according to the source range entry and a new set of data segments and corresponding redundancy segments configured according to the destination range entry, where the migration process creates and stores the data for the new set of data segments and corresponding redundancy segments. It will be noted that occasionally a data segment or redundancy segment may be associated with the same data bank 110 in both configurations. In such cases it may not be necessary to create or move such a data or redundancy segment.

By keeping the original set of data segments and corresponding redundancy segments configured according to the source range entry while migrating these segments to the configuration described by the destination range entry any errors or other failures that occur during the migration process may be dealt with. More specifically, if any errors or failures are detected during this migration process a "fall back" operation may take place, such that the original segments may be accessed using the source range entry, and the original data segments and corresponding redundancy segments stored in accordance with the source range entry, without loss or unavailability of data. The migration process can then be started again using the source range entry (or some other range entry) as a starting point.

During this migration process, one or more commands may be received by data banks 110. If these commands correspond to another volume or portions of the volume that are not currently being migrated these commands may be carried out substantially as described above. For those received commands which correspond to the segments currently being migrated (in other words, the set of segments described by both the source range entry and destination range entry and being moved, created, etc.) it can be determined what type of operation is being requested. If the command is a READ command it may be carried out utilizing the source range entry (in other words, the pertinent segment(s) may be located and read using the configuration described in the source range entry and the READ command executed utilizing these original data and redundancy segments stored according to the source range entry). If, however, the command is a WRITE command the command may be carried out utilizing both the source range entry and the destination range entry. In other words, the pertinent original segment(s) may be located and written according to the above procedure for a WRITE command using the configuration described in the source range entry utilizing these original data and redundancy segments stored according to the source range entry, additionally, the pertinent original segment(s) may be located and written according to the above procedure for a WRITE command using the configuration described in the destination range entry utilizing these new data and redundancy segments stored according to the destination range entry.

After the completion of the migration of the set of segments from the original data and redundancy segments stored according to the source range entry to the new set of data segments and redundancy segments configured according to the destination range entry a "fall forward" may occur at step 1580. This "fall forward" operation may entail the integration of the destination range entry into the table describing the volume and the alteration of the Type designation of the destination range entry to indicate it is a normal range entry. This "fall forward" operation may be accomplished by copying values from the destination range entry to the source destination entry, the manipulation of memory pointers or some other operation entirely.

In any event, at the completion of the "fall forward" operation the table for the volume will have a new range entry describing the same segments as the source range entry (which has been replaced in the table describing the volume by this new range entry), marked as a normal "Type" and describing the new configuration for the range (for example, new databank count, new databank order, new RAID level, new RAID size, etc.)

At some later point then, range entries (for example, one or more new range entries as described above) having the same configuration may be consolidated at step 1590. In one embodiment, if two or more range entries in a table corresponding to a volume have the same configuration (for example, same databank count, databank order, same RAID level, same RAID size, etc.) but correspond to different sets of segments these range entries may combined into one range entry. This combination may be accomplished, for example, by altering the start and end entries of one range entry to encompass the address of both the range entries and deleting the other range entry. This consolidation process may occur as a background process the periodically evaluates the range entries in the volume tables to determine if one or more range entries should be consolidated.

To aid in an understanding of the above migration process, attention is now directed to FIGS. 16-21 which depict the tables and range entries in an example of one embodiment of a migration process. With respect to this example, suppose initially the a volume has been created on a distributed RAID system comprising five databanks 110, where the volume comprises 10,000 segments and the volume is divided into two ranges: a first range of 5000 segments stored on four of the five databanks 110, with RAID 5 and a (3+1) parity set and a second range of 5000 segments stored on five of the five databanks 110, with RAID 5 and a (4+1) parity set.

Referring now to FIG. 16, one embodiment of a table 1650 for this example volume which may a part of tables 240 stored in each of data stores 250 of each data bank 110 in a distributed RAID system is depicted. More specifically, the volume stored on the distributed RAID system comprising five data banks 110, comprises 10,000 segment (as reflected by value of the Segment Count field of the table 1650) in two ranges (as reflected by the value of the Range Count field of the table 1650). The first range is described by the first range entry 1624*a* which is a normal range entry (as reflected by the value of the Type field of the first range entry 1624*a*). The segments corresponding to the first range (which comprise the segments of the volume corresponding to table 1650 with the addresses 0 to 4999 as reflected by the values of the Start and End fields of the first range entry 1624*a*) are arranged across four of the five data banks according to the data bank permutation "2, 4, 3, 1" (as reflected by the values of the Databank Count and Databank Order fields in first range entry 1624*a*) and RAID 5 is implemented with respect to these segments with a parity size of 3+1 (as reflected by the Network RAID level and Network RAID size fields in first range entry 1624*a*).

The second range is described by the second range entry 1624*b* which is a normal range entry (as reflected by the value of the Type field of the first range entry 1624*b*). The segments corresponding to the first range (which comprise the segments of the volume corresponding to table 1650 with the addresses 5000 to 9999 as reflected by the values of the Start and End fields of the first range entry 1624*b*) are arranged across all five data banks 110 according to the data bank permutation "4, 2, 1, 3, 5" (as reflected by the values of the Databank Count and Databank Order fields in first range entry 1624*b*) and RAID 5 is implemented with respect to these segments with a parity size of 4+1 (as reflected by the Network RAID level and Network RAID size fields in first range entry 1624*a*). It will be noted with respect to FIG. 16 and the other FIGURES corresponding to this example that only certain values of certain entries are discussed in order to illustrate this particular example, and the discussion of these entries and values should in no way be taken as restriction on the presence or values of other entries which may or not be in such tables.

Now suppose that a data bank 110 is added to the distributed RAID system on which the volume is stored, bringing the number of data banks 110 in the distributed RAID system to six. Further suppose that as a result of the addition of the sixth data bank 110, the volume represented by table 1650 is selected for migration and that moreover, the second range represented by range entry 1624*b* has been selected for migration within this volume (STEPS 1505, 1510). At this point it will be determined that there are a different number of data banks 110 (STEP 1520). Assuming now that there is space in each of the data stores 250 of the six data banks 110 of the distributed RAID system to store the segments and corresponding redundancy data associated with the second range, the new Databank Count determined for the destination range (after migration) will be six and a new Databank Order for the migration of the second range may be determined (STEP 1530). For purposes of this example, suppose that the newly determined Databank Order is "1, 6, 2, 3, 4, 5". Next, the RAID level and RAID size for the destination range may be determined. Again, assume that no change has been made to the level of RAID desired, thus the RAID level will still be 5, however, as one more data bank 110 has been added, the RAID size (in this case, parity size) for this RAID level may now be changed to (5+1).

Once the databank order, databank count, RAID level and RAID size have been determined (one or more of which may be the same as the existing range of the volume), the source range of the source volume is partitioned (STEP 1550). Turning to FIG. 17, one embodiment of the table 1650 for this example volume after the partitioning of the second range is depicted. Note before discussing in more detail that as the first range entry 1624*a* is not being discussed further, the entries corresponding to the first range entry 1624*a* have been condensed and thus do not appear in FIG. 17 or in the remainder of the FIGURES corresponding to this example.

In the present example, the range being migrated originally comprised 5000 segments having the addresses 5000-9999. Assuming for purposes of this example a migration size of 1000, new range entry 1624*c* will be created in table 1650 where the new range entry 1624*c* corresponds to 1000 segments of the original range (as reflected by the Start (5000) and End (5999) fields of the range entry 1624*c*) New range entry 1624*c* also reflects the configuration of the original range (in other words) before migration (as reflected by the Databank Count (5), Databank Order ("4, 2, 1, 3, 5"), Network RAID level (5) and Network RAID size (4+1) fields of the range entry).

Similarly the range entry 1624*b* corresponding to the original range and the table 1650 describing the volume may be updated to reflect the partition. Specifically, the Start (6000) and End fields (9999) of the original range entry 1624*b* may be changed to reflect the partition of the 1000 segments of the original range entry into newly created range entry 1624*c* while the Range Count (3) filed of the table may also be altered to reflect this partition (in this case the partition increased the number of range entries by one). The newly created range entry 1624*c* may then be marked as a source for purposes of the data migration (as reflected by the Type field (Source) of the new range entry 1624*c*.

Notice then, that with respect to the two range entries 1624*b* and 1624*c* both the original range entry 1624*b* and the newly created range entry 1624*c*, while having been configured to reflect the partitioning of the 1000 segments into the new range entry 1624*c*, in other respects still reflects the configuration of the original range entry 1624*b*. The difference being that the configuration of the original range entry 1624*b* indicates that the segments corresponding to the original range entry 1624*b* are not undergoing migration (for example, the Type (Normal) field of original range entry 1624*b*). In contrast, new range entry corresponding to the 1000 segments previously corresponding to the original range entry 1624*b* reflects that these 1000 segments are currently undergoing migration (for example, the Type (Source) filed of the new range entry 1624*c*).

Once the original range has been partitioned to create a source range entry (here new range entry 1624*c*) a destination range entry corresponding to the source range entry may be created and configured. Turning to FIG. 18, one embodiment of the creation of a destination range entry for this example is depicted. Here destination range entry 1626 is a duplicate of the new range entry 1624*c* (the value of the fields is the same) with the exception that the Type field of the destination range entry 1626 is set to "Destination". Thus, there now exists new range entry 1624*c* (referred to also as the source range entry)

which is a part of table 1650 describing the range being migrated, and the destination range entry 1626 which may, in one embodiment, be separate from table 1650 or associated with table 1650 or new range entry 1624*c*.

The destination range entry may then be configured by assigning the destination range entry 1626 the values corresponding to the databank count, databank order, RAID level and RAID size which were determined above for the corresponding range of the migrated volume. At this point then, the source range entry describes the currently implemented configuration for example, the databank count, databank order, RAID level, RAID size, etc.) associated with a set of segments (equal in number to the migration segment size) of the original range, while the destination range entry describes the configuration associated with the same set of segments as it is to be implemented in the migrated volume.

Thus, there now exists new range entry 1624*c* (the source range entry) which is a part of table 1650 describing the old configuration of the range being migrated, and the destination range entry 1626 which may, in one embodiment, be separate from table 1650, and which described the range being migrated in the new configuration (in other words, the configuration of the segments described by the range entry 1626 (and associated redundancy segments) after the migration process).

Using the source range entry 1624*c* and the destination range entry 1626, the set of segments may then be migrated from the configuration described by the source range entry to the configuration described by the destination range entry 1626 (STEP 1570). This migration process may ensure that the set of segments are stored according to the databank order of the destination range entry 1626 and that any data corresponding to the implementation of RAID in conjunction with the destination range 1626 (in other words according to the RAID level and RAID size of the destination range entry 1626) is created and stored at an appropriate location such that the RAID information is appropriately distributed across data banks 110 to ensure that the desired level of RAID is achieved with respect to the set of segments.

Accordingly, during this migration process there will be an original set of data segments and corresponding redundancy segments configured according to the source range entry 1624*c* stored on data banks 110 and a new set of data segments and corresponding redundancy segments configured according to the destination range entry 1626*c* stored on data banks 110, where the migration process creates and stores the data for the new set of data segments and corresponding redundancy segments. By keeping the original set of data segments and corresponding redundancy segments configured according to the source range entry 1624*c* while migrating these segments to the configuration described by the destination range entry 1626 any errors or other failures that occur during the migration process may be dealt with. More specifically, if any errors or failures are detected during this migration process a "fall back" operation may take place, such that the original segments may be accessed using the source range entry and the original data segments and corresponding redundancy segments stored in accordance with the source range entry without loss or unavailability of data. The migration process can then be started again using the source range entry (or some other range entry) as a starting point.

Assuming no error occur during this migration process, however, a "fall forward" process may occur after the completion of the migration of the set of segments from the original data and redundancy segments stored according to the source range entry 1624*c* to the new set of data segments and redundancy segments configured according to the destination range entry 1626 (STEP 1580). In other words, at this point there exist the original set of segments and corresponding redundancy segments configured according to source range entry 1624*c* and the new set of segments and corresponding redundancy segments created during the migration process to conform to configuration described by destination range entry 1626. This "fall forward" operation may be initiated such that the new set of segments and corresponding set of redundancy segments may be utilized with respect to commands received by the data banks 110. In other words, that command may now be carried exclusively with respect to the new segments and corresponding redundancy segments.

Thus, this "fall forward" operation may entail the integration of the destination range entry 1626 into the table 1650 describing the volume and the alteration of the Type designation of the destination range entry 1626*c* to indicate it is now a normal range entry (in other words the corresponding segments are not undergoing migration and may be normally accessed). In one embodiment, the "fall forward" operation may be accomplished by copying values from the destination range entry 1626 to the source destination entry 1624*c*, the manipulation of memory pointers or some other operation entirely. In any event, at the completion of the "fall forward" operation the table 1650 for the volume will comprise a new range entry describing the same segments as the source range entry 1624*c* (which has been replaced in the table 1650 describing the volume by the new range entry), marked as a normal "Type" and describing the destination configuration (for example, new databank count, new databank order, new RAID level, new RAID size, etc.)

Turning to FIG. 19, one embodiment of a table 1650 after a fall forward operation in the preceding example is depicted. Here, table 1650 now comprises new range entry 1624*d* which has replaced third range entry 1624*c* (depicted in FIG. 18). Note that new range entry 1624*d* describes the same set of segments in the same configuration as described by the destination range entry 1626 (for example, new range entry 1624*d* describes the same segment addresses 5000-5999, the same network RAID level (5), the same network RAID size (5+1), the same Databank Count (6), the same Databank Order ("1, 6, 2, 3, 4, 5", etc.) but, in contrast to destination range entry 1626, the Type of new range entry 1624*d* has the value "Normal". Accordingly, as the set of segments and corresponding redundancy segments are stored on data banks 110 in the configuration described in new range entry 1624*d*, the configuration of the set of segments and corresponding redudnacy segments is described by new range entry 1624*d* into table 1650 describing the volume, these segments and corresponding redundancy segments may be accessed normally using new range entry 1624*d*. Thus, the migration process for these set of segments is completed. The migration process may then be carried out with respect to the next set of segments (for example, of the next migration segment size of segments).

It may be realized after reading the above that once the migration process has been carried out multiple times there may be a number of range entries in a table describing a volume where each of these range entries correspond to different segments (in other words sets of segments with different addresses), but each of the sets of segments is configured similarly (for example, according to the new configuration, including the same random permutation of data banks 110, same number of data banks 110, same RAID level, etc.). In this case, it may be desirable after a certain time period to consolidate one or more range entries in a table describing a volume, where consolidating these range entries comprises combining these range entries into a single range entry which describes both set of segments and the same configuration.

The consolidation of range entries may be better understood with reference to FIGS. 20-21 which depict one example of this consolidation process in accordance with a continuation of the example of FIGS. 16-19. More specifically, FIG. 20 depicts table 1650 after another migration has taken place with respect to the set of segments corresponding to addresses 6000-6999. Thus, at this point, new range entry 1624e has just been created in table 1650 where new range entry 1624e corresponds to the set of segments 6000-6999 and describes the configuration of this set of segments and the corresponding redundancy segments (for example, new range entry 1624e describes the segment addresses 6000-6999, network RAID level (5), network RAID size (5+1), Databank Count (6), Databank Order ("1, 6, 2, 3, 4, 5", etc.).

Additionally, as described above the previously added range entry 1624d describes a previously migrated set of segments in the same configuration as described by the new range entry 1624e (for example, range entry 1624d describes a different segment addresses 5000-5999, the same network RAID level (5), the same network RAID size (5+1), the same Databank Count (6), the same Databank Order ("1, 6, 2, 3, 4, 5", etc.). Accordingly, as range entry 1624e and 1624e correspond to different sets of segments and corresponding redundancy segments configured according to the same configuration it may be desired to consolidate range entry 1624d and range entry 1624e.

FIG. 21 depicts the resulting table 1650 after this configuration process. Notice with respect to table 1650 that range entry 1624d and range entry 1624e have been combined into range entry 1624f. As can be seen then, range entry 1624f now corresponds to both sets of segments previously corresponding to range entry 1624d and range entry 1624e (as reflected by the Start value (5000) and End value (6999) of range entry 1624f) and describes the same configuration as both range entry 1624d and range entry 1624e (for example, network RAID level (5), network RAID size (5+1), Databank Count (6), Databank Order ("1, 6, 2, 3, 4, 5"), etc.). Thus, both sets of segments and corresponding redundancy segments previously described and accessed using range entries 1624d and 1624e may now be accessed using a single range entry 1624f. It will be apparent that the consolidation of range entries may occur either synchronously or asynchronously to other operations of a distributed RAID system, a data bank 110, a distributed RAID application 210, including synchronously or asynchronously to the migration of other ranges, volumes, etc. Additionally, it will be apparent that such a consolidation process may occur at almost any time interval desired or be triggered by almost any event desired, including for example, the completion of the migration of a certain number of segments, etc.

After a review of the above description of the migration process, it will be understood how such a migration process may be utilized in conjunction with a variety of potentialities which may occur during the operation of a distributed RAID system, including the addition or removal of a data bank 110 from the distributed RAID system, a desired change in RAID level for one or more of the volumes stored in the distributed RAID system, the addition or removal of a storage from a data store 250 of a data bank 110, etc.

There is, additionally, another situation which may present during operation of the distributed RAID system where the migration process as described above may be also be useful. This situation may be related to the failure of a disk drive within a data store 250 of a data bank 110. Thus, before discussing the migration process involved with failure of a disk drive it may be helpful to first discuss one embodiment of sparing provisions which may be made with respect to a distributed RAID system.

Figure 22:
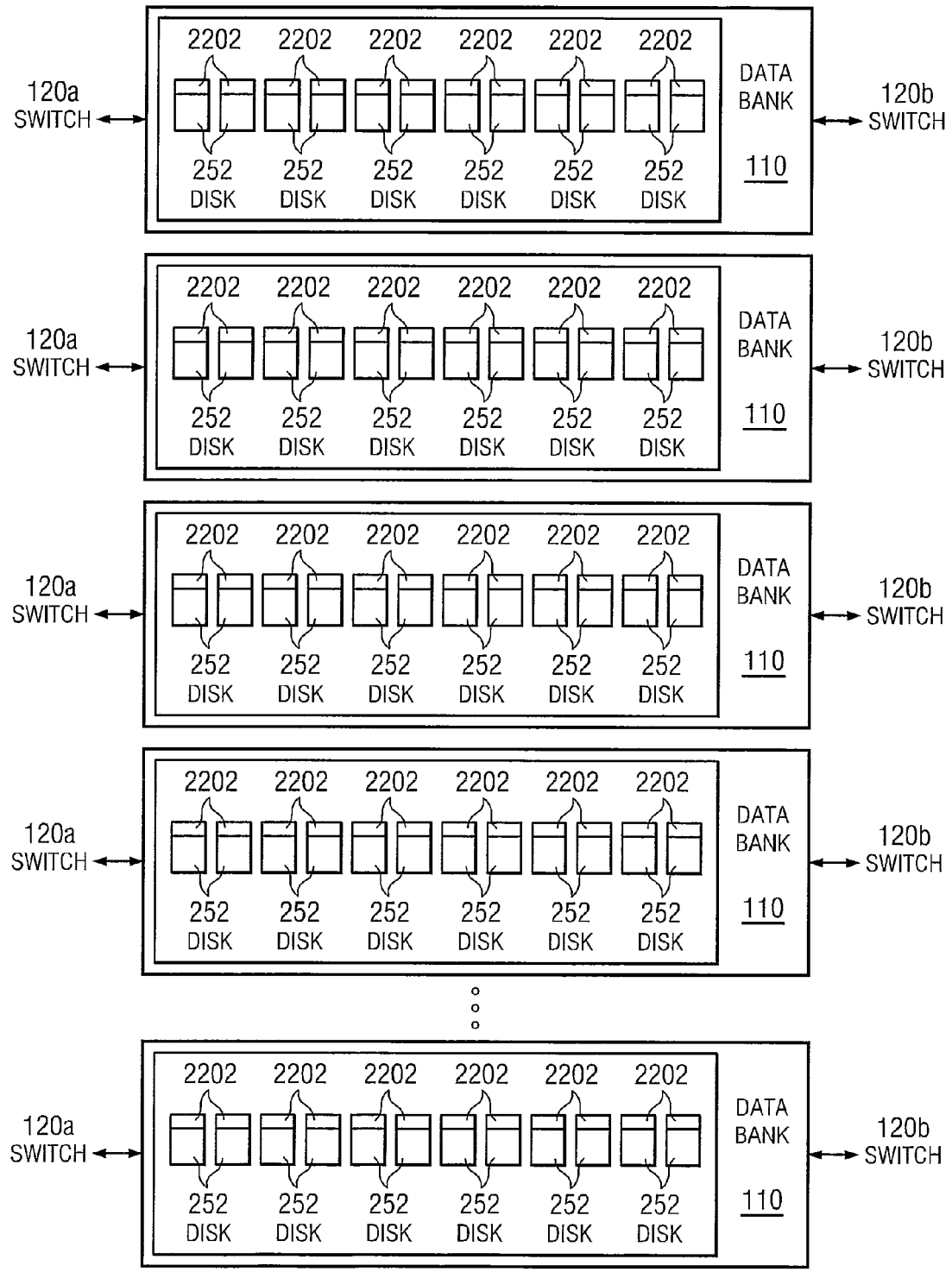
FIG. 22 is block diagram of an example of one embodiment of an architecture employing a distributed RAID system.

To that end, attention is directed to FIG. 22 which depicts one embodiment of a distributed RAID system which includes a set of data banks 110, each having a data store 250 comprising a set of disks 250. In many cases a mean time between failure for disks 252 may be relatively high with respect to other components of the distributed RAID system. Thus, an efficient methodology for recovering from the failure of a disk 252 in a distributed RAID system may be desired.

Accordingly, in one embodiment, a sparing portion 2202 of one or more disks 252 on one or more of the data stores 250 of each data bank 110 may be reserved (for example, remain unallocated or unutilized in normal operation), where the aggregate size of the sparing portions 2202 may be equal to the largest disk 252 in all of the data stores 250. More particularly, in one embodiment, each disk 252 of each data store 250 may have an equally sized sparing portion 2202 reserved, where the aggregate size of all the sparing portions 2202 of each disk 252 in each data reserve may equal to, or larger than, the size of a disk 252. Expressed mathematically, if the number of disks 252 comprising all of the data stores 250 is N and the size of each of the disks 252 is X the sparing portion 2202 of each disk 250 may be approximately equal to X/N or X/(N-1). For a numerical example, suppose the each of the disks 252 in the data stores 250 are all 1 TB in size. In this case, the aggregate size of the sparing portions 2202 of each disk 252 (or one less than the number of disks 252) may be equal to approximately 1 TB.

By reserving this sparing portion 2202 of each disk 252, whenever a disk 252 fails this failure can be accounted for by distributing the data stored on the failed disk 252 across each of the sparing portions 2202 reserved on each of the non-failed disks 252 in each of data store 250, if needed. More specifically, when a failure of a disk 252 in a data store 250 occurs, a volume stored on that disk 252 may be migrated such that the data segments and corresponding redundancy segments of that volume stored in other disks 252 of the distributed RAID system may not need to be migrated, but that the segments stored on the failed disk 252 will be migrated to the sparing portions 2202 of the other disks 252 in the distributed RAID system.

In one embodiment, the migration of a volume in conjunction with a disk failure may be accomplished in this manner through a selection of an appropriate permutation of data banks 110 (in other words, the order of data banks 110 for the new configuration of the volume may be selected to minimize transfer of segments which were not stored on the failed disk 252). Additionally, by tracking the number of disks 252 in each data bank 110 used to store the new volume the segments associated with the volume which were stored on the failed disk 252 may be effectively migrated to the sparing portion 2202 of each disk 252.

To illustrate with an actual example, assume for a moment that a distributed RAID system comprises three data banks 110, each data bank 110 having a data store 250 comprising a set of twelve disks 252, each disk 252 1TB in size. Assume further that a volume is stored on this example of a distributed RAID system, where the volume is represented by the example table 2350 depicted in FIG. 23. Note with respect to table 2350 that initially, the volume represented by table 2350 is stored on all three data banks 110 of the distributed RAID system.

Specifically, the volume has one range (represented by range entry 2324) which is stored according to the Databank Order "2, 3, 1" where the data bank "2" has a Disk Count of 12 and a Disk Order of "2, 4, 3, 1, 5, 6, 8, 7, 9, 11, 10 12" meaning that segments of associated with the volume which are to be stored on data bank "2" are stored on the disks 252 in the data store 250 of data bank "2" according to this order.

In other words, the first segment to be stored on data bank "2" is stored on disk "2" of data store 250 of data bank "2", the second segment to be stored on data bank "2" is stored on disk "4" of data store 250 of data bank "2," etc. The thirteenth segment to be stored on data bank "2" is stored on disk "2" of data store 250 of data bank "2," the second segment to be stored on data bank "2" is stored on disk "4" of data store 250 of data bank "2", etc. Segments associated with the volume are similarly stored on the twelve disks 252 of data bank "3" according to the corresponding Disk Order "11, 7, 6, 2, 3, 4, 9, 8, 10, 5, 1, 12" and on the twelve disks 252 data bank "1" according to the corresponding Disk Order "5, 7, 6, 11, 12, 3, 4, 9, 8, 10, 5, 2, 1."

Suppose now, that after operating for a period of time in conjunction with the volume represented by the table 2350, a disk 252 on one of the data banks 110 of the distributed RAID system fails. Specifically, suppose that disk "9" of data bank "3" fails. In this case, the data associated with the volume represented by table 2350 may be migrated to the sparing portions 2202 of each of the 12 disks 252 of data banks "2" and "1" and 11 disks of data bank "3".

Specifically, in one embodiment, this may be done by selecting values for the configuration of the new volume which may entail that during the migration process for the volume only segments stored on disk "9" if data bank "3" may need to be migrated to other locations. It will be noted that as the segments to be migrated to other locations in this example reside on a failed disk, the migration of these segments may entail the recreation of the segments (for example, from a redundancy segment or, in the case of redundancy segments, from the data segments on which the redundancy segment is based) before the segment is stored in its new location (for example, a sparing portion 2202 of a disk 252).

Thus, after the migration process for the example volume described above the table representing the volume may be similar to table 2450 depicted in FIG. 24. Specifically, the volume still has one range (represented by range entry 2424) which is stored according to the Databank Order "2, 3, 1" where the data bank "2" has a Disk Count of 12 and a Disk Order of "2, 4, 3, 1, 5, 6, 8, 7, 9, 11, 10 12" meaning that segments of associated with the volume which are to be stored on data bank "2" are stored on the disks 252 in the data store 250 of data bank "2" according to this order. Segments associated with the volume are similarly stored on the twelve disks 252 data bank "1" according to the corresponding Disk Order "5, 7, 6, 11, 12, 3, 4, 9, 8, 10, 5, 2, 1." However, notice now that the Disk Count associated with data bank "3" now has the value of "11" as one of the disks 252 of data bank "3" has failed and the Disk Order "11, 7, 6, 2, 3, 4, 9, 8, 10, 5, 1, 12" associated with data bank "3" no longer includes disk "9" as disk "9" has failed. Thus, the segments of the migrated volume may b stored according to the configuration depicted in table 2424 after the migration process caused by the failure of disk "9" on data bank "3" of the distributed RAID system.

With respect to the discussion above regarding migration of data in response to a failure of a disk 252, in the example discussed data was moved onto sparing portions 2202 of operational disks 252 in the distributed RAID system, however, in cases where there is free storage on disks 252 of the distributed RAID system which is not sparing portion 2202, the segments stored on the failed disk may be migrated to this free storage on each of the disks 252. Thus, there may be cases where segments of a volume on a failed disk 252 may be migrated to areas of other disks 252 on data stores 250 of data banks 110 which are not the sparing portion 2202 or cases where some segments on a failed disk may be migrated to areas of other disks 252 on data stores 250 of data banks 110 which are not the sparing portion 2202 while other segments which resided on the failed disk may be migrated to the sparing portions 2202 of other disks 252.

Regardless of the location on a disk 252 to which the segments on the failed disk are migrated the migration process may occur substantially similarly to the embodiments of the migration process discussed above.

In any event, once a failed disk 252 has been replaced it may be desired to rebuild the volume. This rebuilding may entail a migration process by which the segments of the volume (originally stored on the failed disk 252) which were migrated to locations on the other disks 252 of the distributed RAID system are migrated back to the disk 252 which was replaced. In one embodiment, the rebuild of a volume in conjunction with a disk replacement may be accomplished substantially in reverse to this process described above through a selection of an appropriate Databank Order, Disk Counts and Disk Orders. Thus, after the replacement of a failed disk 252 and the rebuilding process, a volume may substantially resemble its original configuration before the disk failure.

Another important point to note with respect to the above description is that in many cases segments associated with multiple different volumes may be stored on a failed disk. Thus, the order in which the segments corresponding to each of those volumes is migrated to other disks 252 of the distributed RAID system in the case of a disk failure or the order in which the segments corresponding to the volume are rebuilt (for example, restored to their original configuration) when a disk is replaced may be of some importance, as various volumes may contain relatively more important data, may be accessed with greater frequency, etc.

Accordingly, in one embodiment the different performance characteristics associated with different volumes may be taken into account in conjunction with a migration process corresponding to a volume. In particular, in one embodiment, these different performance characteristics may be accounted for during a rebuilding process for multiple volumes whose segments previously resided on a failed disk and where each of these volumes is being migrated in conjunction with a rebuilding process after this failed disk is replaced. While embodiments of accounting for these performance characteristics will be described in conjunction with such rebuilding processes it should be noted that other embodiments may be equally well applied in other contexts which entail migration.

FIG. 25 depicts one embodiment of a method for selecting volumes to migrate. At step 2510 a migration process comprising multiple volumes may be initiated. This process may be initiated in response to a failure of a disk 252, such that segments associated with multiple volumes may need to be migrated to other disks in the distributed RAID system; the process may be initiated in response to the replacement of a failed disk such that segments associated with multiple volumes may need to be migrated from their current storage location back to at least the replacement disk 252; or the process may be initiated in response to a variety of other occurrences such as the addition or removal of data banks 110 from the distributed RAID system, a change of RAID level for multiple volumes, the installation of or removal of disks 252 of a data store, some combination of these events, or some other occurrence entirely.

Based on the migration process initiated, at step 2520 it can be determined which volumes will be involved in the initiated migration process. This determination may be made, for example, based on which volumes have segments which are stored on a failed disk or a removed data bank, which volumes have segment that are to be moved to an added data bank or disk, or to a replacement disk, etc.

After the volumes impacted by the initiated migration process have been determined, the volumes can be prioritized at step 2530 based upon a variety of criteria. These criteria may include for example, such things as a quality of service designation associated with a volume or a number of accesses to the volume or some combination of these criteria.

More specifically, in one embodiment a quality of service indicator may be stored in a table corresponding to the volume (for example, quality of service indicator 514 of table 550 of FIG. 5). This quality of service indicator may indicate a relative level priority with respect to other volumes having a different quality of service indicator maintained by the distributed RAID system. For example, a volume whose table has quality of service indicator of "1" may be relatively higher priority with respect to a volume whose table has a quality service indicator of "2". This quality of service indicator may, for example, be set when a user defines the volume, as discussed above. This quality of service indicators associated with each of the impacted volumes may be used to prioritize these volumes Another criterion which may be used to prioritize the impacted volumes may be the number of access to the volumes. In one embodiment, a table of tables 240 on each data bank 110 may track the number of accesses to each volume over a period of time (minute, hour, day, etc.). The number of accesses to each volume may be used to prioritize the volumes. For example, the volume with the highest number of accesses may be assigned the highest priority and the volume with least number of accesses may be assigned the lowest priority.

It will be apparent that almost any criterion desired may be used to prioritize the volumes and that combinations of these criteria may be utilized as well. For example, the impacted volumes may be initially prioritized based upon a quality of service indicator associated with the volume and amongst volumes which have the same quality of service indicator associated with them, they may be prioritized based upon number of accesses to the volume over a given time period.

Once the impacted volumes have been prioritized, the migration process for these volumes may be carried out at step 2540. Specifically, the migration process may be done in conjunction with the priority of that volume, such that higher priority volumes may be migrated before those volumes with lower priority levels. By migrating the volumes according to the priority levels, higher priority volumes may be rebuilt or otherwise achieve a higher level of functionality before those volumes with lower priority.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for implementing distributed Redundant Array of Independent Disks (RAID), comprising:
    a plurality of data banks, each data bank coupled to each of one or more hosts and each of the other plurality of data banks, each data bank including:
        a processor;
        a data store;
        a computer readable medium comprising instructions executable to:
            store a volume and redundancy data corresponding to the volume on each of the plurality of data banks, such that a first set of data segments corresponding to the volume and a corresponding first set of redundancy segments are stored on the plurality of data banks according to a first configuration comprising a first RAID level, a first RAID size, a first Databank Count, a first Databank Order, a first Disk Count and a first Disk Order; and
            migrate the volume from the first configuration to a second configuration comprising one or more of a second RAID level different from the first RAID level, a second RAID size different from the first RAID size, a second Databank Count different from the first Databank Count, a second Databank Order different from the first Databank Order, a second Disk Count different from the first Disk Count or a second Disk Order different from the first Disk Order.

2. The system of claim 1, wherein migration of the volume comprises copying one or more of the first set of data segments from a first data bank on which the one or more first set of data segments are stored to a second data bank according to the second configuration.

3. The system of claim 2, wherein migration of the volume comprises creating one or more second redundancy segments corresponding to a second set of data segments and storing the one or more second redundancy segments on the plurality of data banks according to the second configuration.

4. The system of claim 3, wherein the volume corresponds to a table having a first range entry corresponding to the first configuration and the instructions are further executable to:
    create a first source range entry from the first range entry, wherein the first source range entry corresponds to a first portion of the first set of data segments and the first configuration;
    create a first destination range entry based upon the first source range entry, wherein the first destination range entry corresponds to the first portion of the first set of data segments and the second configuration; and
    migrate the first portion of the first set of data segments from the first configuration to the second configuration; and
    create a first new range entry in the table corresponding to the first portion of the first set of data segments in the second configuration.

5. The system of claim 4, wherein the instructions are further executable to:
    create a second source range entry from the first range entry, wherein the second source range entry corresponds to a second portion of the first set of data segments and the first configuration;
    create a second destination range entry based upon the second source range entry, wherein the second destination range entry corresponds to the second portion of the first set of data segments and the second configuration; and migrate the second portion of the first set of data segments from the first configuration to the second configuration;

create a second new range entry in the table corresponding to the second portion of the first set of data segments in the second configuration; and consolidate the first new range entry and the second new range entry in the table.

6. The system of claim 3, wherein the instructions are further executable to:

receive a command corresponding to a first data segment of the volume from a first host of the one or more hosts; and if the volume is not currently being migrated, determine the first data bank of the plurality of data banks, wherein the first data bank corresponds to the first data segment, and if the first data bank is the data bank which received the command, execute the command with respect to the first data segment and if not, forward the command to the first data bank.

7. The system of claim 6, wherein the instructions are executable to:

if the volume is currently being migrated, determine the first data bank of the plurality of data banks wherein the first data bank corresponds to the first data segment of the volume in the first configuration, and if the command is a WRITE command determine a second data bank of the plurality of data banks wherein the second data bank corresponds to a first data segment of the volume in the second configuration;

if the first data bank is the data bank which received the command, execute the command with respect to the first data segment and, if not, forward the command to the first data bank; and if the command is the WRITE command, if the second data bank is the data bank which received the command, execute the command with respect to the first segment and, if not, forward the command to the second data bank.

8. A method for distributed Redundant Array of Independent Disks (RAID) implemented on a plurality of data bank computers, each data bank coupled to one or more hosts and each of the other plurality of data banks, comprising:

storing a volume and redundancy data corresponding to the volume on each of the plurality of data banks, such that a first set of data segments corresponding to the volume and a corresponding first set of redundancy segments are stored on the plurality of data banks according to a first configuration comprising a first RAID level, a first RAID size, a first Databank Count, a first Databank Order, a first Disk Count, and a first Disk Order;

determining that the volume is to be migrated; and migrating the volume from the first configuration to a second configuration such that the first set of data segments is stored according to the second configuration and the second configuration comprises one or more of a second RAID level different from the first RAID level, a second RAID size different from the first RAID size, a second Databank Count different from the first Databank Count, a second Databank Order different from the first Databank Order, a second Disk Count different from the first Disk Count, or a second Disk Order different from the first Disk Order.

9. The method of claim 8, wherein migration of the volume comprises copying one or more of the first set of data segments from a first data bank on which the one or more first set of data segments are stored to a second data bank according to the second configuration.

10. The method of claim 9, wherein migration of the volume comprises creating one or more second redundancy segments corresponding to a second set of data segments and storing the one or more second redundancy segments on the plurality of data banks according to the second configuration.

11. The method of claim 10, wherein the volume corresponds to a table having a first range entry corresponding to the first configuration and the method further comprises:

creating a first source range entry from the first range entry, wherein the first source range entry corresponds to a first portion of the first set of data segments and the first configuration;

creating a first destination range entry based upon the first source range entry, wherein the first destination range entry corresponds to the first portion of the first set of data segments and the second configuration; and migrating the first portion of the first set of data segments from the first configuration to the second configuration; and creating a first new range entry in the table corresponding to the first portion of the first set of data segments in the second configuration.

12. The method of claim 11, further comprising:

creating a second source range entry from the first range entry, wherein the second source range entry corresponds to a second portion of the first set of data segments and the first configuration;

creating a second destination range entry based upon the second source range entry, wherein the second destination range entry corresponds to the second portion of the first set of data segments and the second configuration; and migrating the second portion of the first set of data segments from the first configuration to the second configuration;

creating a second new range entry in the table corresponding to the second portion of the first set of data segments in the second configuration; and consolidating the first new range entry and the second range entry in the table.

13. The method of claim 10, further comprising:

receiving a command corresponding to a first data segment of the volume from a first host of the one or more hosts; and if the volume is not currently being migrated, determining the first data bank of the plurality of data banks, wherein the first data bank corresponds to the first data segment and if the first data bank is the data bank which received the command, executing the command with respect to the first data segment and, if not, forwarding the command to the first data bank.

14. The method of claim 13, further comprising:

if the volume is currently being migrated, determining the first data bank of the plurality of data banks wherein the first data bank corresponds to the first data segment of the volume in the first configuration, and if the command is a WRITE command, determining a second data bank of the plurality of data banks, wherein the second data bank corresponds to the first data segment of the volume in the second configuration;

if the first data bank is the data bank which received the command, executing the first command with respect to the first data segment and, if not, forwarding the first command to the first data bank; and if the command is the WRITE command, if the second data bank is the data bank which received the command, executing the command with respect to the first segment and, if not, forwarding the command to the second data bank.

15. A computer readable medium comprising computer executable instructions for implementing distributed Redundant Array of Independent Disks (RAID) on a plurality of data bank computers, the computer instructions executable for:
storing a volume and redundancy data corresponding to the volume on each of the plurality of data banks, such that a first set of data segments corresponding to the volume and a corresponding first set of redundancy segments are stored on the plurality of data banks according to a first configuration comprising a first RAID level, a first RAID size, a first Databank Count, a first Databank Order, a first Disk Count and a first Disk Order; and
migrating the volume from the first configuration to a second configuration such that the first set of segments is stored according to the second configuration and the second configuration comprises one or more of a second RAID level different from the first RAID level, a second RAID size different from the first RAID size, a second Databank Count different from the first Databank Count, a second Databank Order different from the first Databank Order, a second Disk Count different from the first Disk Count or a second Disk Order different from the first Disk Order.

16. The computer readable medium of claim 15, wherein migration of the volume comprises copying one or more of the first set of data segments from a first data bank on which the one or more first set of data segments are stored to a second data bank according to the second configuration.

17. The computer readable medium of claim 16, wherein migration of the volume comprises creating one or more second redundancy segments corresponding to a second set of data segments and storing the one or more second redundancy segments on the plurality of data banks according to the second configuration.

18. The computer readable medium of claim 17, wherein the volume corresponds to a table having a first range entry corresponding to the first configuration and the method further comprises:
creating a first source range entry from the first range entry, wherein the first source range entry corresponds to a first portion of the first set of data segments and the first configuration;
creating a first destination range entry based upon the first source range entry, wherein the first destination range entry corresponds to a first portion of the first set of data segments and the second configuration; and
migrating the first portion of the first set of data segments from the first configuration to the second configuration; and
creating a first new range entry in the table corresponding to the first portion of the first set of data segments in the second configuration.

19. The computer readable medium of claim 18, wherein the instructions are further executable for:
creating a second source range entry from the first range entry, wherein the second source range entry corresponds to a second portion of the first set of data segments and the first configuration;
creating a second destination range entry based upon the second source range entry, wherein the second destination range entry corresponds to the second portion of the first set of data segments and the second configuration; and
migrating the second portion of the first set of data segments from the first configuration to the second configuration;
creating a second new range entry in the table corresponding to the second portion of the first set of data segments in the second configuration; and
consolidating the first new range entry and the second new range entry in the table.

20. The computer readable medium of claim 16, wherein the instructions are further executable for:
receiving a command corresponding to the first data segment of the volume from a first host of the one or more hosts; and
if the volume is not currently being migrated, determining the first data bank of the plurality of data banks, wherein the first data bank corresponds to the first data segment and if the first data bank is the data bank which received the command, executing the command with respect to the first data segment and, if not, forwarding the command to the first data bank.

21. The computer readable medium of claim 20, wherein the instructions are further executable for:
if the volume is currently being migrated, determining the first data bank of the plurality of data banks, wherein the first data bank corresponds to the first data segment of the volume in the first configuration, and if the command is a WRITE command, determining a second data bank of the plurality of data banks, wherein the second data bank corresponds to the first data segment of the volume in the second configuration;
if the first data bank is the data bank which received the command, executing the first command with respect to the first data segment and, if not, forwarding the first command to the first data bank; and
if the command is the WRITE command, if the second data bank is the data bank which received the command, executing the command with respect to the first segment and, if not, forwarding the command to the second data bank.

* * * * *